(12) United States Patent
Templeman et al.

(10) Patent No.: US 9,489,981 B2
(45) Date of Patent: Nov. 8, 2016

(54) SUCCESSIVE INITIALIZATION OF TELEVISION CHANNEL RECORDING

(71) Applicant: EchoStar Technologies, LLC, Englewood, CO (US)

(72) Inventors: Mark Templeman, Parker, CO (US); Yunfeng Yang, Aurora, CO (US); Mark Sokald, Littleton, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 698 days.

(21) Appl. No.: 13/786,915

(22) Filed: Mar. 6, 2013

(65) Prior Publication Data

US 2013/0243405 A1     Sep. 19, 2013

Related U.S. Application Data

(60) Provisional application No. 61/611,483, filed on Mar. 15, 2012.

(51) Int. Cl.
*G11B 27/026* (2006.01)
*H04N 5/76* (2006.01)
(Continued)

(52) U.S. Cl.
CPC ............. *G11B 27/026* (2013.01); *G11B 27/28* (2013.01); *H04N 5/4401* (2013.01); *H04N 5/50* (2013.01);
(Continued)

(58) Field of Classification Search
CPC ............. G11B 27/28; H04N 21/4263; H04N 21/4334; H04N 21/47214; H04N 21/47217; H04N 21/482; H04N 21/4826; H04N 5/4401; H04N 5/50; H04N 5/76; H04N 5/782; H04N 5/91; H04N 7/20; H04N 9/79; H04N 9/797
USPC .................................................. 386/292–296
See application file for complete search history.

(56) References Cited

U.S. PATENT DOCUMENTS 4,706,121 A   11/1987   Young
4,723,246 A    2/1988   Weldon, Jr.
(Continued)

FOREIGN PATENT DOCUMENTS

CN         1595975 A      3/2005
CN         1615017 A      5/2005
(Continued)

OTHER PUBLICATIONS

Extended European Search Report for EP 12825080 mailed Sep. 11, 2014, 10 pages.
(Continued)

*Primary Examiner* — Gelek W Topgyal
(74) *Attorney, Agent, or Firm* — Kilpatrick Townsend & Stockton LLP

(57) ABSTRACT

In various arrangements, a television receiver system for successive initialization of television channel recording is presented. The system may include a control processor, configured to determine a plurality of television channels are configured to begin recording at a same time. The control processor may transmit a first request for recording of a first television channel of the plurality of television channels. The system may include a tuning management processor, configured to configure a first recording of the first television channel in response to the first request. The tuning management processor may also transmit an acknowledgement to the control processor following the first recording of the first television channel being configured. The control processor may, in response to receiving the acknowledgement, transmit, to the tuning management processor, a second request for recording of a second television channel of the plurality of television channels.

20 Claims, 5 Drawing Sheets

(51) Int. Cl.

| | | |
|---|---|---|
| H04N 9/79 | (2006.01) | |
| H04N 21/472 | (2011.01) | |
| H04N 21/482 | (2011.01) | |
| H04N 5/782 | (2006.01) | |
| H04N 21/426 | (2011.01) | |
| H04N 21/433 | (2011.01) | |
| H04N 5/91 | (2006.01) | |
| H04N 5/50 | (2006.01) | |
| H04N 9/87 | (2006.01) | |
| H04N 9/797 | (2006.01) | |
| H04N 5/44 | (2011.01) | |
| G11B 27/28 | (2006.01) | |
| H04N 21/4147 | (2011.01) | |
| H04N 21/43 | (2011.01) | |
| H04N 21/458 | (2011.01) | |
| H04N 5/775 | (2006.01) | |
| H04N 21/4335 | (2011.01) | |
| H04N 21/475 | (2011.01) | |
| H04N 21/45 | (2011.01) | |
| H04N 7/20 | (2006.01) | |

(52) U.S. Cl.
CPC ............... *H04N 5/76* (2013.01); *H04N 5/775* (2013.01); *H04N 5/782* (2013.01); *H04N 5/91* (2013.01); *H04N 9/79* (2013.01); *H04N 9/797* (2013.01); *H04N 9/87* (2013.01); *H04N 21/4147* (2013.01); *H04N 21/4263* (2013.01); *H04N 21/4302* (2013.01); *H04N 21/4334* (2013.01); *H04N 21/4335* (2013.01); *H04N 21/4532* (2013.01); *H04N 21/4583* (2013.01); *H04N 21/4755* (2013.01); *H04N 21/47214* (2013.01); *H04N 21/47217* (2013.01); *H04N 21/482* (2013.01); *H04N 7/20* (2013.01); *H04N 21/4826* (2013.01)

(56) References Cited

U.S. PATENT DOCUMENTS

| | | | |
|---|---|---|---|
| 4,802,215 | A | 1/1989 | Mason |
| 5,187,589 | A | 2/1993 | Kono et al. |
| 5,335,277 | A | 8/1994 | Harvey et al. |
| 5,483,277 | A | 1/1996 | Granger |
| 5,488,658 | A | 1/1996 | Hirashima |
| 5,541,738 | A | 7/1996 | Mankovitz |
| 5,642,153 | A | 6/1997 | Chaney et al. |
| 5,682,597 | A | 10/1997 | Ganek et al. |
| 5,684,969 | A | 11/1997 | Ishida |
| 5,724,646 | A | 3/1998 | Ganek et al. |
| 5,805,763 | A | 9/1998 | Lawler et al. |
| 5,974,218 | A | 10/1999 | Nagasaka et al. |
| 6,049,333 | A | 4/2000 | LaJoie et al. |
| 6,263,504 | B1 | 7/2001 | Ebisawa |
| 6,453,115 | B1 | 9/2002 | Boyle |
| 6,628,891 | B1 | 9/2003 | Vantalon et al. |
| 6,701,528 | B1 | 3/2004 | Arsenault et al. |
| 6,766,523 | B2 | 7/2004 | Herley |
| 6,798,971 | B2 | 9/2004 | Potrebic |
| 6,938,208 | B2 | 8/2005 | Reichardt |
| 7,024,676 | B1 | 4/2006 | Klopfenstein |
| 7,409,140 | B2 | 8/2008 | Rodriguez et al. |
| 7,487,529 | B1 | 2/2009 | Orlick |
| 7,490,169 | B1 | 2/2009 | Ogdon et al. |
| 7,493,312 | B2 | 2/2009 | Liu et al. |
| 7,505,081 | B2 | 3/2009 | Eshleman |
| 7,542,656 | B2 | 6/2009 | Cho et al. |
| 7,577,751 | B2 | 8/2009 | Vinson et al. |
| 7,590,993 | B1 | 9/2009 | Hendricks et al. |
| 7,684,672 | B2 | 3/2010 | Matoba |
| 7,715,552 | B2 | 5/2010 | Pinder et al. |
| 7,730,517 | B1 | 6/2010 | Rey et al. |
| 7,739,711 | B2 | 6/2010 | Finseth et al. |
| 7,760,986 | B2 | 7/2010 | Beuque |
| 7,804,861 | B2 | 9/2010 | Kim |
| 7,848,618 | B2 | 12/2010 | Potrebic et al. |
| 7,856,557 | B2 | 12/2010 | Beuque |
| 7,926,078 | B2 | 4/2011 | Arsenault et al. |
| 7,929,697 | B2 | 4/2011 | McNeely et al. |
| 7,962,937 | B2 | 6/2011 | Cho et al. |
| 8,006,268 | B2 | 8/2011 | Sloo |
| 8,201,194 | B2 | 6/2012 | Wijnands et al. |
| 8,321,466 | B2 | 11/2012 | Black et al. |
| 8,364,671 | B1 | 1/2013 | Sinton et al. |
| 8,437,622 | B2 | 5/2013 | Casagrande |
| 8,447,170 | B2 | 5/2013 | Casagrande |
| 8,566,873 | B2 | 10/2013 | Sie et al. |
| 8,584,167 | B2 | 11/2013 | Vanduyn |
| 8,606,088 | B2 | 12/2013 | Kummer et al. |
| 8,627,349 | B2 | 1/2014 | Kirby et al. |
| 8,660,412 | B2 | 2/2014 | Kummer et al. |
| 8,763,027 | B2 | 6/2014 | Martch |
| 8,774,608 | B2 | 7/2014 | Kummer et al. |
| 8,819,722 | B2 | 8/2014 | Kummer et al. |
| 8,819,761 | B2 * | 8/2014 | Minnick ............... H04N 5/782 725/139 |
| 8,850,476 | B2 | 9/2014 | VanDuyn et al. |
| 8,867,893 | B2 | 10/2014 | Kirby |
| 8,959,544 | B2 | 2/2015 | Kummer et al. |
| 8,959,566 | B2 | 2/2015 | Kummer |
| 8,989,562 | B2 | 3/2015 | Kummer et al. |
| 8,997,153 | B2 | 3/2015 | Templeman |
| 9,031,385 | B2 | 5/2015 | Casagrande et al. |
| 9,043,843 | B2 | 5/2015 | Templeman et al. |
| 9,055,274 | B2 | 6/2015 | Casagrande |
| 9,088,763 | B2 | 7/2015 | Martch et al. |
| 9,113,222 | B2 | 8/2015 | VanDuyn |
| 9,177,605 | B2 | 11/2015 | Minnick et al. |
| 9,177,606 | B2 | 11/2015 | Kirby |
| 9,185,331 | B2 | 11/2015 | Martch et al. |
| 9,191,694 | B2 | 11/2015 | Casagrande |
| 9,202,524 | B2 | 12/2015 | Martch et al. |
| 9,264,779 | B2 | 2/2016 | Kirby et al. |
| 9,269,397 | B2 | 2/2016 | Casagrande et al. |
| 9,349,412 | B2 | 5/2016 | Templeman |
| 9,350,937 | B2 | 5/2016 | Kummer et al. |
| 9,357,159 | B2 | 5/2016 | Martch et al. |
| 9,361,940 | B2 | 6/2016 | Minnick |
| 2001/0028782 | A1 | 10/2001 | Ohno et al. |
| 2001/0033736 | A1 | 10/2001 | Yap et al. |
| 2001/0034787 | A1 | 10/2001 | Takao et al. |
| 2002/0044658 | A1 | 4/2002 | Wasilewski et al. |
| 2002/0054752 | A1 | 5/2002 | Wood et al. |
| 2002/0055343 | A1 | 5/2002 | Stetzler et al. |
| 2002/0087979 | A1 | 7/2002 | Dudkiewicz et al. |
| 2002/0087983 | A1 | 7/2002 | Son et al. |
| 2002/0092021 | A1 | 7/2002 | Yap et al. |
| 2002/0095510 | A1 | 7/2002 | Sie et al. |
| 2002/0097340 | A1 | 7/2002 | Takagi et al. |
| 2002/0116705 | A1 * | 8/2002 | Perlman ............... H04N 5/4401 725/31 |
| 2002/0120925 | A1 | 8/2002 | Logan |
| 2002/0126221 | A1 | 9/2002 | Link |
| 2002/0141431 | A1 | 10/2002 | Tripathy |
| 2002/0144259 | A1 | 10/2002 | Gutta et al. |
| 2002/0144266 | A1 | 10/2002 | Goldman et al. |
| 2002/0152299 | A1 | 10/2002 | Traversat et al. |
| 2002/0164147 | A1 | 11/2002 | Suda |
| 2002/0168178 | A1 | 11/2002 | Rodriguez et al. |
| 2002/0174430 | A1 | 11/2002 | Ellis et al. |
| 2002/0184638 | A1 | 12/2002 | Agnihortri et al. |
| 2002/0188943 | A1 | 12/2002 | Freeman et al. |
| 2003/0005454 | A1 | 1/2003 | Rodriguez et al. |
| 2003/0026423 | A1 | 2/2003 | Unger et al. |
| 2003/0078930 | A1 | 4/2003 | Surcouf et al. |
| 2003/0097659 | A1 | 5/2003 | Goldman |
| 2003/0110514 | A1 | 6/2003 | West et al. |
| 2003/0149988 | A1 | 8/2003 | Ellis et al. |
| 2003/0152360 | A1 | 8/2003 | Mukai et al. |
| 2003/0156826 | A1 | 8/2003 | Sonoda et al. |
| 2003/0177492 | A1 | 9/2003 | Kanou |

(56) References Cited

U.S. PATENT DOCUMENTS

| | | |
|---|---|---|
| 2003/0177495 A1 | 9/2003 | Needham et al. |
| 2003/0200548 A1 | 10/2003 | Baran et al. |
| 2003/0208763 A1 | 11/2003 | McElhatten et al. |
| 2003/0208767 A1 | 11/2003 | Williamson et al. |
| 2003/0226150 A1 | 12/2003 | Berberet et al. |
| 2004/0001087 A1 | 1/2004 | Warmus et al. |
| 2004/0003118 A1 | 1/2004 | Brown et al. |
| 2004/0015992 A1 | 1/2004 | Hasegawa et al. |
| 2004/0015999 A1 | 1/2004 | Carlucci et al. |
| 2004/0078829 A1 | 4/2004 | Patel et al. |
| 2004/0080672 A1* | 4/2004 | Kessler ............ H04N 5/4401 348/553 |
| 2004/0103428 A1 | 5/2004 | Seok et al. |
| 2004/0128682 A1 | 7/2004 | Liga et al. |
| 2004/0133923 A1 | 7/2004 | Watson et al. |
| 2004/0162871 A1 | 8/2004 | Pabla et al. |
| 2004/0218905 A1 | 11/2004 | Green et al. |
| 2004/0242150 A1 | 12/2004 | Wright et al. |
| 2004/0268387 A1 | 12/2004 | Wendling |
| 2005/0002640 A1* | 1/2005 | Putterman ............ H04N 5/782 386/213 |
| 2005/0034171 A1 | 2/2005 | Benya |
| 2005/0083865 A1 | 4/2005 | Ashley et al. |
| 2005/0120049 A1 | 6/2005 | Kanegae et al. |
| 2005/0125683 A1 | 6/2005 | Matsuyama et al. |
| 2005/0147383 A1 | 7/2005 | Ihara |
| 2005/0180568 A1 | 8/2005 | Krause |
| 2005/0229213 A1 | 10/2005 | Ellis et al. |
| 2005/0237435 A1* | 10/2005 | Potrebic ............ H04N 5/50 348/731 |
| 2005/0271365 A1 | 12/2005 | Hisatomi |
| 2005/0273819 A1 | 12/2005 | Knudson et al. |
| 2005/0281531 A1 | 12/2005 | Unmehopa |
| 2006/0010464 A1 | 1/2006 | Azami |
| 2006/0020962 A1 | 1/2006 | Stark et al. |
| 2006/0056800 A1 | 3/2006 | Shimagami et al. |
| 2006/0075434 A1 | 4/2006 | Chaney et al. |
| 2006/0080716 A1 | 4/2006 | Nishikawa et al. |
| 2006/0085828 A1 | 4/2006 | Dureau et al. |
| 2006/0120523 A1 | 6/2006 | Kurotaki |
| 2006/0206819 A1 | 9/2006 | Tsuji et al. |
| 2006/0212900 A1 | 9/2006 | Ismail et al. |
| 2006/0215993 A1 | 9/2006 | Yamada |
| 2006/0257099 A1 | 11/2006 | Potrebic et al. |
| 2006/0274208 A1 | 12/2006 | Pedlow, Jr. |
| 2007/0016546 A1 | 1/2007 | De Vorchik et al. |
| 2007/0039032 A1 | 2/2007 | Goldey et al. |
| 2007/0061378 A1 | 3/2007 | Lee et al. |
| 2007/0154163 A1 | 7/2007 | Cordray |
| 2007/0157248 A1 | 7/2007 | Ellis |
| 2007/0157253 A1 | 7/2007 | Ellis et al. |
| 2007/0165855 A1 | 7/2007 | Inui |
| 2007/0183745 A1 | 8/2007 | White |
| 2007/0192586 A1 | 8/2007 | McNeely |
| 2007/0204288 A1 | 8/2007 | Candelore |
| 2007/0234395 A1 | 10/2007 | Dureau et al. |
| 2007/0250856 A1 | 10/2007 | Leavens et al. |
| 2007/0258596 A1 | 11/2007 | Kahn et al. |
| 2008/0022347 A1 | 1/2008 | Cohen |
| 2008/0044158 A1 | 2/2008 | Kido |
| 2008/0046929 A1 | 2/2008 | Cho et al. |
| 2008/0052743 A1 | 2/2008 | Moore |
| 2008/0074547 A1* | 3/2008 | Ida ............ H04N 5/44 348/554 |
| 2008/0092164 A1 | 4/2008 | Agarwal et al. |
| 2008/0092181 A1 | 4/2008 | Britt |
| 2008/0101760 A1 | 5/2008 | Waller |
| 2008/0104534 A1 | 5/2008 | Park et al. |
| 2008/0127253 A1 | 5/2008 | Zhang et al. |
| 2008/0137850 A1 | 6/2008 | Mamidwar |
| 2008/0141322 A1 | 6/2008 | Jang et al. |
| 2008/0144747 A1* | 6/2008 | Tomizawa ....... H04N 21/42615 375/343 |
| 2008/0152039 A1 | 6/2008 | Shah et al. |
| 2008/0184327 A1 | 7/2008 | Ellis et al. |
| 2008/0216119 A1 | 9/2008 | Pfeffer et al. |
| 2008/0216136 A1 | 9/2008 | Pfeffer et al. |
| 2008/0222678 A1 | 9/2008 | Burke et al. |
| 2008/0222681 A1 | 9/2008 | Kwon |
| 2008/0271077 A1 | 10/2008 | Kim et al. |
| 2008/0273698 A1 | 11/2008 | Manders et al. |
| 2008/0273856 A1 | 11/2008 | Bumgardner |
| 2008/0276284 A1 | 11/2008 | Bumgardner et al. |
| 2008/0288461 A1 | 11/2008 | Glennon et al. |
| 2008/0291206 A1 | 11/2008 | Uchimura et al. |
| 2008/0298585 A1 | 12/2008 | Maillard et al. |
| 2008/0301740 A1 | 12/2008 | Tsutsui |
| 2008/0307217 A1 | 12/2008 | Yukimatsu et al. |
| 2009/0025027 A1 | 1/2009 | Craner |
| 2009/0051579 A1 | 2/2009 | Inaba et al. |
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0110367 A1 | 4/2009 | Fukui |
| 2009/0129741 A1 | 5/2009 | Kim |
| 2009/0129749 A1 | 5/2009 | Oyamatsu et al. |
| 2009/0136206 A1 | 5/2009 | Aisu |
| 2009/0150941 A1 | 6/2009 | Riedl et al. |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0210912 A1 | 8/2009 | Cholas et al. |
| 2009/0235298 A1 | 9/2009 | Carlberg et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2009/0320084 A1 | 12/2009 | Azam et al. |
| 2009/0324203 A1 | 12/2009 | Wiklof |
| 2010/0020794 A1 | 1/2010 | Cholas et al. |
| 2010/0037282 A1 | 2/2010 | Iwata et al. |
| 2010/0043022 A1 | 2/2010 | Kaftan |
| 2010/0050225 A1 | 2/2010 | Bennett |
| 2010/0086277 A1 | 4/2010 | Craner |
| 2010/0095323 A1 | 4/2010 | Williamson et al. |
| 2010/0100899 A1 | 4/2010 | Bradbury et al. |
| 2010/0115121 A1 | 5/2010 | Roos et al. |
| 2010/0135639 A1 | 6/2010 | Ellis et al. |
| 2010/0146581 A1 | 6/2010 | Erk |
| 2010/0158479 A1* | 6/2010 | Craner ............ H04N 7/17318 386/241 |
| 2010/0158480 A1 | 6/2010 | Jung et al. |
| 2010/0162285 A1 | 6/2010 | Cohen et al. |
| 2010/0169926 A1 | 7/2010 | Westberg et al. |
| 2010/0195827 A1 | 8/2010 | Lee et al. |
| 2010/0217613 A1 | 8/2010 | Kelly |
| 2010/0232604 A1 | 9/2010 | Eklund, II |
| 2010/0235862 A1 | 9/2010 | Adachi |
| 2010/0239228 A1 | 9/2010 | Sano |
| 2010/0242079 A1 | 9/2010 | Riedl et al. |
| 2010/0246582 A1 | 9/2010 | Salinger et al. |
| 2010/0247067 A1 | 9/2010 | Gratton |
| 2010/0251304 A1 | 9/2010 | Donoghue et al. |
| 2010/0251305 A1 | 9/2010 | Kimble et al. |
| 2010/0254386 A1 | 10/2010 | Salinger et al. |
| 2010/0265391 A1 | 10/2010 | Muramatsu et al. |
| 2010/0284537 A1 | 11/2010 | Inbar |
| 2010/0293583 A1 | 11/2010 | Loebig et al. |
| 2010/0299528 A1 | 11/2010 | Le Floch |
| 2010/0306401 A1 | 12/2010 | Gilson |
| 2010/0313222 A1 | 12/2010 | Lee et al. |
| 2010/0319037 A1* | 12/2010 | Kim .................. H04N 21/2383 725/81 |
| 2010/0329645 A1 | 12/2010 | Sakamoto |
| 2011/0001879 A1 | 1/2011 | Goldey et al. |
| 2011/0007218 A1 | 1/2011 | Moran et al. |
| 2011/0043652 A1 | 2/2011 | King et al. |
| 2011/0078750 A1 | 3/2011 | Tam et al. |
| 2011/0080529 A1 | 4/2011 | Wong |
| 2011/0099364 A1 | 4/2011 | Robyr et al. |
| 2011/0131413 A1 | 6/2011 | Moon et al. |
| 2011/0138169 A1 | 6/2011 | Michel |
| 2011/0138424 A1 | 6/2011 | Vlot |
| 2011/0145854 A1 | 6/2011 | Bacon et al. |
| 2011/0150429 A1 | 6/2011 | Kaneko |

(56) References Cited

U.S. PATENT DOCUMENTS

| | | |
|---|---|---|
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0235701 A1* | 9/2011 | Kim .................. H04N 7/20 375/240.02 |
| 2011/0239249 A1 | 9/2011 | Murison et al. |
| 2011/0255002 A1 | 10/2011 | Witheiler |
| 2011/0286719 A1 | 11/2011 | Woods |
| 2011/0311045 A1 | 12/2011 | Candelore et al. |
| 2012/0183276 A1 | 7/2012 | Quan et al. |
| 2012/0195433 A1 | 8/2012 | Eppolito et al. |
| 2012/0198501 A1 | 8/2012 | Ruan et al. |
| 2012/0236933 A1* | 9/2012 | Saitoh ................ H04N 5/4401 375/240.02 |
| 2012/0278837 A1 | 11/2012 | Curtis et al. |
| 2012/0296745 A1 | 11/2012 | Harper et al. |
| 2012/0301104 A1 | 11/2012 | Dove |
| 2012/0311534 A1 | 12/2012 | Fox et al. |
| 2012/0311634 A1 | 12/2012 | Van Duyn |
| 2012/0331505 A1 | 12/2012 | Chun et al. |
| 2013/0014146 A1 | 1/2013 | Bhatia et al. |
| 2013/0014159 A1 | 1/2013 | Wiser et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0126889 A1 | 5/2014 | Kummer et al. |
| 2014/0130094 A1 | 5/2014 | Kirby et al. |
| 2014/0147102 A1 | 5/2014 | Shartzer et al. |
| 2014/0201767 A1 | 7/2014 | Seiden et al. |
| 2014/0341377 A1 | 11/2014 | Kummer et al. |
| 2014/0344858 A1 | 11/2014 | Minnick |
| 2014/0363139 A1 | 12/2014 | Kirby |
| 2014/0376884 A1 | 12/2014 | Lovell |
| 2015/0040166 A1 | 2/2015 | Tamura et al. |
| 2015/0095948 A1 | 4/2015 | Kummer et al. |
| 2015/0104146 A1 | 4/2015 | Higuchi et al. |
| 2015/0121430 A1 | 4/2015 | Templeman |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1 | 8/2015 | Protrebic et al. |
| 2015/0245113 A1 | 8/2015 | Casagrande |
| 2015/0319400 A1 | 11/2015 | Golyshko |
| 2016/0073144 A1 | 3/2016 | Robinson |
| 2016/0080800 A1 | 3/2016 | Casagrande |
| 2016/0105711 A1 | 4/2016 | Martch et al. |
| 2016/0134926 A1 | 5/2016 | Casagrande et al. |

FOREIGN PATENT DOCUMENTS

| | | |
|---|---|---|
| CN | 101202600 A | 6/2008 |
| CN | 101310532 A | 11/2008 |
| CN | 101 404 780 A | 4/2009 |
| CN | 101978690 A | 2/2011 |
| EP | 0 903 743 A | 3/1999 |
| EP | 0 973 333 A | 1/2000 |
| EP | 1 001 631 A1 | 5/2000 |
| EP | 1 168 347 A | 1/2002 |
| EP | 1372339 A2 | 12/2003 |
| EP | 1 447 983 A1 | 8/2004 |
| EP | 1 742 467 A2 | 1/2007 |
| EP | 2 018 059 A1 | 1/2009 |
| EP | 2 317 767 A1 | 5/2011 |
| EP | 2 357 563 A1 | 8/2011 |
| EP | 1 667 452 B1 | 11/2011 |
| EP | 2 403 239 A1 | 1/2012 |
| EP | 2 541 929 A1 | 1/2013 |
| EP | 2 826 197 A1 | 1/2015 |
| EP | 2 826 238 A1 | 1/2015 |
| GB | 2 459 705 A | 11/2009 |
| IN | 9740/CHENP/2013 A | 9/2014 |
| JP | 2007 116525 A | 5/2007 |
| JP | 2010165058 A | 7/2010 |
| WO | 98/12872 A1 | 3/1998 |
| WO | 01/24532 A1 | 4/2001 |
| WO | 02/41625 A1 | 5/2002 |
| WO | 2004/057610 A1 | 7/2004 |
| WO | 2007/047410 A2 | 4/2007 |
| WO | 2008/010118 A1 | 1/2008 |
| WO | 2008/010689 A1 | 1/2008 |
| WO | 2008/060486 A2 | 5/2008 |
| WO | 2011/027236 A1 | 3/2011 |
| WO | 2011/081729 A1 | 7/2011 |
| WO | 2012/003693 A1 | 1/2012 |
| WO | 2013/028824 A3 | 2/2013 |
| WO | 2013/028829 A2 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |
| WO | 2016/066443 A1 | 5/2016 |

OTHER PUBLICATIONS

Extended European Search Report for EP 12825521 mailed Nov. 24, 2014, 7 pages.
International Search Report and Written Opinion of PCT/US2013/031440 mailed May 30, 2013, 14 pages.
International Preliminary Report on Patentability for PCT/US2013/031440 mailed Sep. 25, 2014, 8 pages.
The Office Action dated Nov. 6, 2014 for Mexican Patent Application No. MX/a/2013/014677 is not translated into English, 2 pages.
U.S. Appl. No. 14/095,860, filed Dec. 3, 2013 Non-Final Office Action mailed Dec. 26, 2014, 45 pages.
U.S. Appl. No. 14/043,617, filed Oct. 1, 2013 Non-Final Office Action mailed Jan. 5, 2015, 45 pages.
U.S. Appl. No. 13/856,752, filed Apr. 4, 2013 Non Final Office Action mailed Nov. 5, 2014, 34 pages.
U.S. Appl. No. 13/829,350, filed Mar. 14, 2013 Final Office Action mailed Jan. 23, 2015, 18 pages.
U.S. Appl. No. 13/799,653, filed Mar. 13, 2013 Notice of Allowance mailed Nov. 26, 2014, 32 pages.
U.S. Appl. No. 13/797,173, filed Mar. 12, 2013 Notice of Allowance mailed Nov. 24, 2014, 37 pages.
U.S. Appl. No. 13/757,168, filed Feb. 1, 2013 Notice of Allowance mailed Oct. 14, 2014, 28 pages.
U.S. Appl. No. 13/294,005, filed Nov. 11, 2011 Notice of Allowance mailed Oct. 31, 2014, 24 pages.
U.S. Appl. No. 13/292,047, filed Nov. 8, 2011 Final Office Action mailed Jan. 13, 2015, 22 pages.

(56) References Cited

OTHER PUBLICATIONS

U.S. Appl. No. 13/215,598, filed Aug. 23, 2011 Non-Final Office Action mailed Nov. 25, 2014, 18 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Preliminary Report on Patentability for PCT/US2013/032176 issued Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
U.S. Appl. No. 13/302,852, filed Nov. 22, 2011 Non-Final Rejection mailed Sep. 2, 2014, 28 pages.
U.S. Appl. No. 13/793,636, filed Mar. 11, 2013 Non-Final Office Action mailed Sep. 29, 2014, 27 pages.
U.S. Appl. No. 13/800,477, filed Mar. 13, 2013 Non-Final Office Action mailed Sep. 11, 2014, 34 pages.
Author Unknown, "EE Launches home TV service in UK," dated Oct. 8, 2014, 3 pages. Retrieved on Oct. 13, 2014 from http://www.bbc.com/news/technology-29535279.
Author Unknown, "EE TV It's simply great television," Accessed on Oct. 13, 2014, 11 pages. Retrieved from https//ee.co.uk/ee-and-me/ee-tv.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
U.S. Appl. No. 13/795,914, filed Mar. 6, 2013, Non-Final Office Action mailed Oct. 11, 2013, 17 pages.
International Search Report and Written Opinion of PCT/US2013/32176 mailed on Jun. 25, 2013, 15 pages.
International Search Report and Written Opinion of PCT/US2013/031565 mailed on May 31, 2013, 103 pages.
International Search Report and Written Opinion of PCT/US2013/031915 mailed on Jun. 3, 2013, 7 pages.
International Search Report of PCT/KR2007/003521 mailed on Oct. 23, 2007.
International Search Report PCT/IB2003/005737 mailed on Mar. 3, 2004.
Jensen, Craig, "Fragmentation: the condition, the cause, the cure" 'Online!, Executive Software International, 1994; retrieved from Internet: <URL: www.executive.com/fragbook/fragbook.htm> retrieved on Mar. 2, 2004! * Chapter: "How a disk works", Section: "The original problem".
International Search Report and Written Opinion of PCT/US2012/51992 mailed Nov. 2, 2012, 15 pages.
International Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Preliminary Report on Patentability for PCT/US2012/052002 mailed on Apr. 17, 2014, 10 pages.
International Search Report and Written Opinion of PCT/US2012/51964 mailed Nov. 2, 2012, 13 pages.
International Search Report and Written Opinion of PCT/US2012/052011 mailed Dec. 17, 2012, 44 pages.
International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
Author Unknown, "Move Networks is Delivering the Next Generation of Television," Move Networks, 2010, obtained online at http://movenetworks.com/, 2 pages.
Jung, J., et al., "Design and Implementation of a Multi-Stream CableCARD with a High-Speed DVB-Common Descrambler," ACM Multimedia, 2006, 4 pages.
U.S. Appl. No. 13/149,852, filed May 31, 2011, Non-Final Office Action mailed Dec. 12, 2012, 9 pages.
U.S. Appl. No. 13/149,852, filed May 31, 2011, Final Office Action mailed Mar. 26, 2013, 13 pages.
U.S. Appl. No. 13/149,852, filed May 31, 2011, Notice of Allowance mailed Jul. 11, 2013, 13 pages.
U.S. Appl. No. 13/286,157, filed Oct. 31, 2011, Non-Final Office Action mailed Jan. 17, 2013, 20 pages.
U.S. Appl. No. 13/286,157, filed Oct. 31, 2011, Non-Final Office Action mailed Jul. 25, 2013, 49 pages.
U.S. Appl. No. 13/286,157, filed Oct. 31, 2011, Notice of Allowance mailed Feb. 3, 2014, 81 pages.
U.S. Appl. No. 13/215,702, filed Aug. 23, 2011, Notice of Allowance mailed Feb. 11, 2013, 13 pages.
U.S. Appl. No. 13/288,002, filed Nov. 2, 2011, Non-final Office Action mailed Sep. 26, 2013, 15 pages.
U.S. Appl. No. 13/288,002, filed Nov. 2, 2011, Final Office Action mailed Mar. 27, 2014, 20 pages.
U.S. Appl. No. 13/302,852, filed Nov. 22, 2011, Non-Final Rejection mailed May 23, 2013, 19 pages.
U.S. Appl. No. 13/302,852, filed Nov. 22, 2011, Final Rejection mailed Dec. 9, 2013, 23 pages.
U.S. Appl. No. 13/324,831, filed Dec. 13, 2011 Non-Final Office Action mailed Feb. 28, 2013, 23 pages.
U.S. Appl. No. 13/324,831, filed Dec. 13, 2011 Notice of Allowance mailed Sep. 4, 2013, 22 pages.
U.S. Appl. No. 13/292,047, filed Nov. 8, 2011 Non-Final Office Action mailed Jan. 18, 2013, 17 pages.
U.S. Appl. No. 13/292,047, filed Nov. 8, 2011 Final Office Action mailed Aug. 19, 2013, 17 pages.
U.S. Appl. No. 13/614,899, filed Sep. 13, 2012 Non-Final Office Action mailed Feb. 5, 2013, 17 pages.
U.S. Appl. No. 13/614,899, filed Sep. 13, 2012, Non-Final Office Action mailed Sep. 17, 2013, 17 pages.
U.S. Appl. No. 13/614,899, filed Sep. 13, 2012, Final Office Action mailed Mar. 17, 2014, 41 pages.
U.S. Appl. No. 13/291,014, filed Nov. 7, 2011, Non-Final Office Action mailed Mar. 29, 2013, 21 pages.
U.S. Appl. No. 13/291,014, filed Nov. 7, 2011, Notice of Allowance mailed Aug. 7, 2013, 16 pages.
U.S. Appl. No. 13/215,598, filed Aug. 23, 2011, Non-Final Office Action mailed Jun. 20, 2013, 15 pages.
U.S. Appl. No. 13/215,598, filed Aug. 23, 2011, Final Office Action mailed Nov. 21, 2013, 23 pages.
U.S. Appl. No. 13/215,598, filed Aug. 23, 2011, Non-Final Office Action mailed Feb. 6, 2014, 12 pages.
U.S. Appl. No. 13/215,655, filed Aug. 23, 2011, Non-Final Office Action mailed Sep. 6, 2013, 27 pages.
U.S. Appl. No. 13/215,655, filed Aug. 23, 2011, Final Office Action mailed Dec. 18, 2013, 20 pages.
U.S. Appl. No. 13/215,916, filed Aug. 23, 2011, Notice of Allowance mailed Jan. 4, 2013, 10 pages.
U.S. Appl. No. 13/294,005, filed Nov. 11, 2011, Non-Final Office Action mailed Aug. 14, 2013, 32 pages.
U.S. Appl. No. 13/294,005, filed Nov. 11, 2011, Final Office Action mailed Jan. 3, 2014, 29 pages.

(56) References Cited

OTHER PUBLICATIONS

U.S. Appl. No. 13/592,976, filed Aug. 23, 2012, Notice of Allowance mailed Oct. 7, 2013, 18 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/829,350, filed Mar. 14, 2013, Non Final Office Action mailed Feb. 28, 2014, 29 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Non Final Office Action mailed Oct. 25, 2013, 79 pages.
U.S. Appl. No. 13/799,719, filed Mar. 13, 2013, Notice of Allowance mailed Apr. 23, 2014, 141 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
U.S. Appl. No. 14/340,190, filed Jul. 24, 2014, Non-Final Rejection mailed Aug. 31, 2015, 74 pages.
U.S. Appl. No. 14/154,887, filed Jan. 14, 2014 Non-Final Rejection mailed Jul. 17, 2015, 33 pages.
U.S. Appl. No. 13/799,604, filed Mar. 13, 2013, Notice of Allowance mailed Jul. 24, 2015, 34 pages.
U.S. Appl. No. 13/288,002, filed Nov. 2, 2011 Non Final Rejection mailed Jul. 28, 2015, 29 pages.
U.S. Appl. No. 13/829,350, filed Mar. 14, 2013 Notice of Allowance mailed Jul. 24, 2015, 29 pages.
U.S. Appl. No. 14/043,617, filed Oct. 1, 2013 Final Office Action mailed Jul. 16, 2015, 45 pages.
Supplementary European Search Report for EP 13761291.7 mailed Jul. 9, 2015, 8 pages.
Extended European Search Report for EP 13760237.1 received Jul. 21, 2015, 8 pages.
First Office Action and Search Report from the State Intellectual Property Office (SIPO) for CN 201280031434.7, issued Jul. 17, 2015, 12 pages.
Office Action dated Jul. 31, 2015 for Mexican Patent Application No. MX/a/2014/009928, 2 pages.
U.S. Appl. No. 13/856,752, filed Apr. 4, 2013 Notice of Allowance mailed Feb. 10, 2015, 20 pages.
U.S. Appl. No. 13/799,604, filed Mar. 13, 2013, Final Office Action mailed Jan. 14, 2015, 36 pages.
U.S. Appl. No. 13/797,173, filed Mar. 12, 2013 Notice of Allowance mailed Feb. 26, 2015, 19 pages.
U.S. Appl. No. 13/793,636, filed Mar. 11, 2013, Notice of Allowance mailed Jan. 28, 2015, 43 pages.
U.S. Appl. No. 13/800,477, filed Mar. 13, 2013 Notice of Allowance mailed Feb. 18, 2015, 18 pages.
Extended European Search Report for EP 12825474 mailed Jan. 7, 2015, 6 pages.
Extended European Search Report for EP 12825430 mailed Feb. 3, 2015, all pages.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug 23, 2011 Final Office Action mailed Jul. 2, 2014, 22 pages.
U.S. Appl. No. 13/294,005, filed Nov. 11, 2011 Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
U.S. Appl. No. 14/095,860, filed Dec. 3, 2013 Final Office Action mailed May 1, 2015, 18 pages.
U.S. Appl. No. 14/060,388, filed Oct. 22, 2013, Notice of Allowance mailed Apr. 13, 2015, 44 pages.
U.S. Appl. No. 13/888,012, filed May 6, 2013 Non-Final Rejection mailed Apr. 6, 2015, 36 pages.
U.S. Appl. No. 13/801,968, filed Mar. 13, 2013 Non Final Office Action mailed May 21, 2015, 49 pages.
U.S. Appl. No. 13/614,899, filed Sep. 13, 2012, Notice of Allowance mailed Mar. 13, 2015, 35 pages.
U.S. Appl. No. 13/302,852, filed Nov. 22, 2011, Final Rejection mailed Mar. 30, 2015, 29 pages.
European Search Report for EP 12825653 dated Mar. 11, 2015, 7 pages.
Supplementary European Search Report for Application No. EP 12825147 dated Mar. 27, 2015, 9 pages.
The Notice of Allowance by the Mexican Institute of Industrial Property for Mexican Patent Application No. MX/a/2013/014907 dated Feb. 20, 2015 is not translated into English, 1 page.
The Notice of Allowance by the Mexican Institute of Industrial Property for Mexican Patent Application No. MX/a/2013/014677 dated Mar. 19, 2015 is not translated into English, 1 page.
The second Office Action dated Feb. 26, 2015 for Mexican Pat. Appln. No. MX/a/2013/014217 is not translated into English, 3 pages.
U.S. Appl. No. 13/215,598, filed Aug 23, 2011 Final Office Action mailed May 5, 2015, 17 pages.
U.S. Appl. No. 14/467,959, filed Aug. 25, 2014 Notice of Allowance mailed Jun. 22, 2015, 36 pages.
U.S. Appl. No. 14/095,860, filed Dec. 3, 2013 Notice of Allowance mailed Jul. 13, 2015, 31 pages.
U.S. Appl. No. 13/888,012, filed May 6, 2013 Notice of Allowance mailed Jul. 14, 2015, 18 pages.
U.S. Appl. No. 13/799,604, filed Mar. 13, 2013, Notice of Allowance mailed May 29, 2015, 46 pages.
U.S. Appl. No. 13/302,852, filed Nov. 22, 2011, Notice of Allowance mailed Jun. 19, 2015, 26 pages.
U.S. Appl. No. 13/292,047, filed Nov. 8, 2011 Non-Final Office Action mailed Jul. 7, 2015, 28 pages.
The Notice of Allowance by the Mexican Institute of Industrial Property for Mexican Patent Application No. MX/a/2013/014671 dated Apr. 17, 2015, 1 page.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
U.S. Appl. No. 14/340,190, filed Jul. 24, 2014, Final Rejection mailed Feb. 19, 2016, 54 pages.
U.S. Appl. No. 14/154,887, filed Jan. 14, 2014 Notice of Allowance mailed Jan. 21, 2016, 26 pages.
U.S. Appl. No. 13/288,002, filed Nov. 2, 2011 Final Rejection mailed Jan. 13, 2016, 22 pages.
U.S. Appl. No. 13/292,047, filed Nov. 8, 2011 Notice of Allowance mailed Jan. 29, 2016, 45 pages.
U.S. Appl. No. 13/215,598, filed Aug. 23, 2011 Non Final Office Action mailed Dec. 15, 2015, all pages.
U.S. Appl. No. 13/801,968, filed Mar. 13, 2013 Final Office Action mailed Nov. 19, 2015, all pages.
U.S. Appl. No. 14/589,090, Notice of Allowance mailed Feb. 9, 2016, 47 pages.
U.S. Appl. No. 14/591,549, Non Final Office Action mailed Dec. 31, 2015, 19 pages.
U.S. Appl. No. 14/338,114, filed Jul. 22, 2014 Notice of Allowance mailed Feb. 3, 2016, all pages.
Second Office Action for CN 201280031434.7, issued Dec. 23, 2015, 6 pages.

(56) References Cited

OTHER PUBLICATIONS

First Office Action issued by State Intellectual Property Office (SIPO) for CN 201280028697.2, issued Dec. 16, 2015, 11 pages.
Notice of Allowance received for Mexican Patent Appln. MX/a/2013/014991, mailed on Dec. 9, 2015, 1 page.
Notice of Allowance mailed Dec. 4, 2015 for Mexican Patent Application No. MX/a/2014/009723, 1 page.
Supplementary European Search Report for EP 13760902 mailed Oct. 20, 2015, all pages.
Supplementary European Search Report for EP 13761427 mailed Oct. 19, 2015, all pages.
Office Action dated Jul. 31, 2015 for Mexican Patent Application No. MX/a/2014/009919, 2 pages.
U.S. Appl. No. 13/801,994, Non Final Office Action mailed Oct. 7, 2015, 55 pages.
U.S. Appl. No. 14/095,860, filed Dec. 3, 2013 Notice of Allowance mailed Oct. 19, 2015, 14 pages.
U.S. Appl. No. 14/338,114, filed Jul. 22, 2014 Non-Final Office Action mailed Sep. 30, 2015, all pages.
U.S. Appl. No. 14/529,989, filed Oct. 31, 2014 Non-Final Office Action mailed Nov. 4, 2015, all pages.
U.S. Appl. No. 14/043,617, filed Oct. 1, 2013 Non-Final Office Action mailed Oct. 23, 2015, all pages.
U.S. Appl. No. 14/676,137, filed Apr. 1, 2015 Notice of Allowance mailed Sep. 28, 2015, 35 pages.
International Search Report and Written Opinion of PCT/US2015/065934 mailed Apr. 8, 2016, all pages.
International Search Report and Written Opinion of PCT/EP2015/073937 mailed Apr. 15, 2016, all pages.
U.S. Appl. No. 14/757,606, filed Dec. 23, 2015, Non Final Rejection mailed Mar. 24, 2016, 33 pages.
U.S. Appl. No. 13/215,598, filed Aug. 23, 2011, Notice of Allowance mailed May 24, 2016, all pages.
U.S. Appl. No. 13/801,968, filed Mar. 13, 2013 Notice of Allowance mailed Apr. 7, 2016, 33 pages.
U.S. Appl. No. 13/801,994, Final Office Action mailed May 4, 2016, 37 pages.
U.S. Appl. No. 14/529,989, filed Oct. 31, 2014, Final Rejection mailed May 6, 2016, 27 pages.
U.S. Appl. No. 14/043,617, filed Oct. 1, 2013, Final Office Action mailed May 6, 2016, 56 pages.
Decision to Grant from the State Intellectual Property Office (SIPO) for CN 201280031434.7, issued May 12, 2016, all pages.
Notice of Allowance dated Jan. 15, 2016 for Mexican Patent Application No. MX/a/2014/009928, 1 page.
Notice of Allowance dated Dec. 16, 2015 for Mexican Patent Application No. MX/a/2014/009919, 1 page.
First Office Action and Search Report from the State Intellectual Property Office (SIPO) for CN 201280031150.8, issued Aug. 3, 2016, 2 pages.
Second Office Action issued by State Intellectual Property Office for CN 201280028697.2, issued Jul. 8, 2016, 6 pages.

\* cited by examiner

SUCCESSIVE INITIALIZATION OF TELEVISION CHANNEL RECORDING

CROSS-REFERENCES TO RELATED APPLICATIONS

This application claims priority to U.S. provisional application 61/611,483, filed Mar. 15, 2012, entitled "Reception, Recording, Storage, and Manipulation of Multiple Television Channels", the entire disclosure of which is hereby incorporated by reference for all purposes.

BACKGROUND

The advent of the digital video recorder (DVR) and the availability of high-capacity computer-readable storage devices at reasonable prices have made available many possibilities to television programming service providers and television viewers alike. In recent years, television viewers have come to expect the ability to easily customize and manage the recording of television programming via their television receivers.

SUMMARY

In some embodiments, a television receiver system for successive initialization of television channel recording may be presented. The system may include a control processor. The control processor may be configured to determine a plurality of television channels are configured to begin recording at a same time. The control processor may be configured to transmit, to a tuning management processor, a first request for recording of a first television channel of the plurality of television channels. The control processor may be configured to in response to receiving an acknowledgement, transmit, to the tuning management processor, a second request for recording of a second television channel of the plurality of television channels. The system may include a tuning management processor. The tuning management processor may be configured to configure a first recording of the first television channel in response to the first request. The tuning management processor may be configured to transmit the acknowledgement to the control processor following the first recording of the first television channel being configured. The tuning management processor may be configured to cause the first television channel to be recorded to a file.

Embodiments of such a system may include one or more of the following: The television receiver system may include a tuner, wherein each television channel of the plurality of television channels is tuned to using the tuner. The tuning management processor may be configured to configure the first recording of the first television channel in response to the first request may include the tuning management processor being configured to tune the tuner to a frequency of a transponder stream, wherein the plurality of television channels are transmitted as part of the transponder stream. The tuning management processor may be configured to initiate a first packet identifier filter for a first packet identifier to capture program data from the transponder stream, wherein the program data indicates packet identifiers of video streams and audio streams of the plurality of television channels. The tuning management processor being configured to configure the first recording of the first television channel in response to the first request may include the tuning management processor being configured to use the program data captured using the first packet identifier filter to determine a second packet identifier and a third packet identifier associated with the first television channel. The tuning processor may be configured to initiate a second packet identifier filter to capture audio data and video data from the transponder stream for the first television channel. The second packet identifier filter may filter based on the second packet identifier and the third packet identifier.

Additionally or alternatively, embodiments of such a system may include one or more of the following: The tuning management processor may be configured to configure a second recording of the second television channel in response to the second request. Configuring the second recording of the second television channel may include the tuning management processor being configured to use the program data captured using the first packet identifier filter to determine a fourth packet identifier and a fifth packet identifier associated with the second television channel; and initiate a third packet identifier filter to capture audio data and video data from the transponder stream for the second television channel, wherein the third packet identifier filter filters using the fourth packet identifier and the fifth packet identifier. The tuning management processor may be further configured to transmit a second acknowledgement to the control processor following the second recording of the second television channel being configured. The television receiver system may be configured to receive an indication of the plurality of television channels to be simultaneously recorded for a period of time from a television service provider via satellite.

In some embodiments, a method for successive initialization of television channel recording may be presented. The method may include determining, by a control processor of a television receiver, a plurality of television channels are configured to begin recording at a same time. The method may include transmitting, by the control processor to a tuning management processor of the television receiver, a first request for reception of a first television channel of the plurality of television channels. The method may include configuring, by the tuning management processor, a first recording of the first television channel in response to the first request. The method may include causing, by the tuning management processor, the first television channel to be recorded to a file. The method may include transmitting, by the tuning management processor to the control processor, an acknowledgement to the control processor following the first recording of the first television channel being configured. The method may include, in response to receiving the acknowledgement, transmitting, by the control processor to the tuning management processor, a second request for reception of a second television channel of the plurality of television channels.

Embodiments of such a method may include one or more of the following: The method may include tuning, using a tuner of the television receiver, to each television channel of the plurality of television channels. Configuring the first recording of the first television channel in response to the first request may include: tuning the tuner to a frequency of a transponder stream, wherein the plurality of television channels are transmitted as part of the transponder stream; and initiating a first packet identifier filter for a first packet identifier to capture program data from the transponder stream, wherein the program data indicates packet identifiers of video streams and audio streams of the plurality of television channels. Configuring the first recording of the first television channel in response to the first request may include: using the program data captured using the first packet identifier filter to determine a second packet identifier and a third packet identifier associated with the first television channel; and initiating a second packet identifier filter to capture audio data and video data from the transponder stream for the first television channel. The second packet identifier filter may filter based on the second packet identifier and the third packet identifier.

Additionally or alternatively, embodiments of such a method may include one or more of the following: The method may include configuring a second recording of the second television channel in response to the second request. Configuring the second recording of the second television channel may include: using the program data captured using the first packet identifier filter to determine a fourth packet identifier and a fifth packet identifier associated with the second television channel; and initiating a third packet identifier filter to capture audio data and video data from the transponder stream for the second television channel. The third packet identifier filter may filter using the fourth packet identifier and the fifth packet identifier. The method may include transmitting, by the tuning management processor, a second acknowledgement to the control processor following the second recording of the second television channel being configured. The method may include receiving, by the television receiver, an indication of the plurality of television channels to be simultaneously recorded for a period of time from a television service provider via satellite.

In some embodiments, an apparatus for successive initialization of television channel recording is presented. The apparatus may include means for determining a plurality of television channels are configured to begin recording at a same time. The apparatus may include means for transmitting a first request for reception of a first television channel of the plurality of television channels. The apparatus may include means for configuring a first recording of the first television channel in response to the first request. The apparatus may include means for causing the first television channel to be recorded to a file. The apparatus may include means for transmitting an acknowledgement following the first recording of the first television channel being configured. The apparatus may include means for transmitting, in response to receiving the acknowledgement, a second request for reception of a second television channel of the plurality of television channels.

Embodiments of such an apparatus may include one or more of the following: The apparatus may include means for tuning to each television channel of the plurality of television channels. The means for configuring the first recording of the first television channel in response to the first request may include: means for tuning to a frequency of a transponder stream, wherein the plurality of television channels are transmitted as part of the transponder stream; and means for initiating a first packet identifier filter for a first packet identifier to capture program data from the transponder stream, wherein the program data indicates packet identifiers of video streams and audio streams of the plurality of television channels. The means for configuring the first recording of the first television channel in response to the first request may include means for using the program data captured using the first packet identifier filter to determine a second packet identifier and a third packet identifier associated with the first television channel; and means for initiating a second packet identifier filter to capture audio data and video data from the transponder stream for the first television channel, wherein the second packet identifier filter filters based on the second packet identifier and the third packet identifier.

Additionally or alternatively, embodiments of such an apparatus may include one or more of the following: The apparatus may include means for configuring a second recording of the second television channel in response to the second request. The means for configuring the second recording of the second television channel may include: means for using the program data captured using the first packet identifier filter to determine a fourth packet identifier and a fifth packet identifier associated with the second television channel; and means for initiating a third packet identifier filter to capture audio data and video data from the transponder stream for the second television channel. The third packet identifier filter may filter using the fourth packet identifier and the fifth packet identifier. The apparatus may include means for transmitting a second acknowledgement following the second recording of the second television channel being configured.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
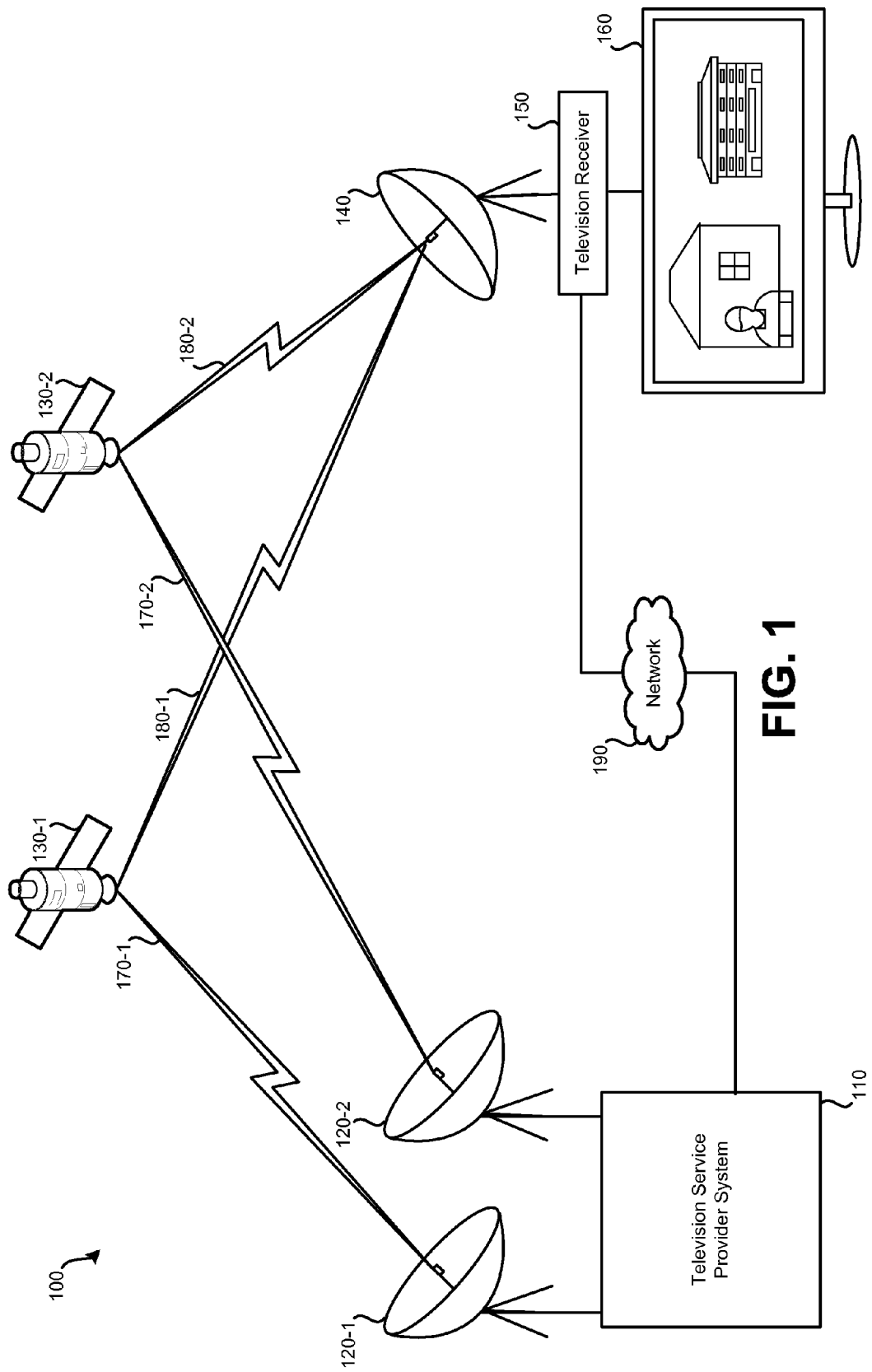
FIG. 1 illustrates an embodiment of a satellite television distribution system.

A television viewer, referred to as a user, may use a stand-alone or integrated digital video recorder (DVR) to record broadcast television programming for viewing at a later time. In some situations, individual television programs may be recorded; in other situations, a television channel may be recorded for a period of time, such as during primetime (which may be from 8-10 PM, 7-9 PM, 7-10 PM, etc.). The recording of a television channel for such a period of time may be defined by the television service provider. During this period of time which the television channel is recorded, multiple television programs may be broadcast on the television channel. For example, sitcoms may tend to be scheduled for thirty minutes, including commercials; dramas may tend to be scheduled for an hour including commercials. Recording of a television channel, such as during primetime, for multiple hours may result in two or more, possibly six, television programs being recorded.

In some embodiments, rather than a single television channel being recorded at a given time, multiple, such as four, television channels may be recorded over a given time period. For example, during weekday primetime hours, all of the major networks may be simultaneously recorded for the same period of time. Such recording may permit a user to view any television program that was broadcast during primetime on one of the major networks at a later time. When multiple television channels are recorded simultaneously, in some embodiments it is efficient to use a single tuner to receive all of the multiple television channels being recorded. This allows other tuners of the television receiver to be used for other operations (e.g., recording of other television channels and/or presentation of television channels to a user via a viewing device, such as a television).

When multiple television channels are scheduled to begin being recorded at a same time (e.g., each major network being scheduled to begin being recorded at 7 PM), various (e.g., hardware, firmware, software) limitations may prevent recording of both television channels from being initiated at precisely the same time. Rather than beginning recording at the same time, requests to begin recording may be sent separately to a component of the television receiver that handles the recording, with a second request being held until an acknowledgement from the component is received that indicates recording in accordance with a first request has successfully been initiated. For example, a control processor may manage a determination of which channels are scheduled] [??] and at what time recording of the television channels is to occur. A tuning management processor may handle the specifics of recording, including tuning a tuner to the proper frequency to receive the television channels, determining packet identifiers (PIDs) of the television channels to be recorded, filtering a received transponder stream by PID, and storing the recording of each television channel to an individual file.

FIG. 1 illustrates an embodiment of a satellite television distribution system 100. While embodiments detailed herein may be applied to various television distribution systems, including cable and IP, a satellite television distribution system is provided as an example. Satellite television distribution system 100 may include: television service provider system 110, satellite transmitter equipment 120, satellites 130, satellite dish 140, television receiver 150, and television 160. Alternate embodiments of satellite television distribution system 100 may include fewer or greater numbers of components. While only one satellite dish 140, television receiver 150, and television 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal paths between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a time.

Figure 2:
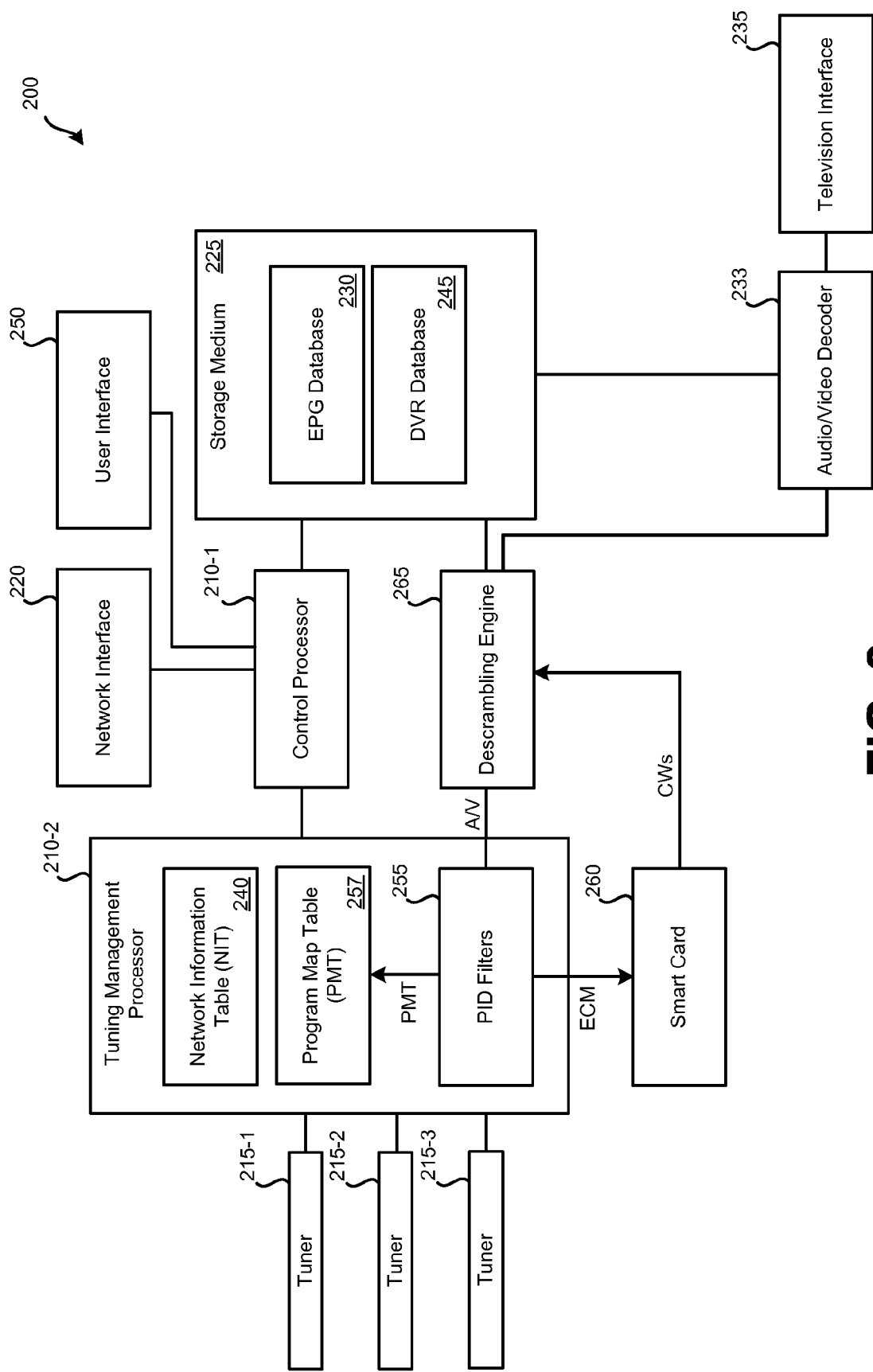
FIG. 2 illustrates an embodiment of a television receiver that is configured to successively initiate television channel recording.

In communication with satellite dish 140 may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of television receiver 150. As such, television receiver 150 may decode signals received via satellite dish 140 and provide an output to television 160. FIG. 2 provides additional detail of a television receiver. A television receiver is defined to include set-top boxes (STBs) and also circuitry having similar functionality that may be incorporated with another device. For instance, circuitry similar to that of a television receiver may be incorporated into a television. As such, while FIG. 1 illustrates an embodiment of television receiver 150 as separate from television 160, it should be understood that in other embodiments, similar functions may be performed by a television receiver integrated with television 160.

Television 160 may be used to present video and/or audio decoded by television receiver 150. Television receiver 150 may also output a display of one or more interfaces to television 160, such as an electronic programming guide (EPG). In some embodiments, a display device other than a television may be used.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. television receiver 150 may decode the received transponder stream. As such, depending on which television channel(s) are desired, a transponder stream from a different satellite (or a different transponder of the same satellite) may be accessed and decoded by television receiver 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and television receiver 150. Via such a secondary communication channel, bidirectional exchange of data may occur. As such, data may be transmitted to television service provider system 110 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates an embodiment of television receiver 200, which may typically be in the form of a separate device configured to be connected with a presentation device, such as a television. Embodiments of television receiver 200 may include set top boxes (STBs). As previously noted, in addition to being in the form of an STB, a television receiver may be incorporated into another device, such as a television. For example, a television may have an integrated television receiver (which does not involve an external STB being coupled with the television). A STB may contain some or all of the components of television receiver 200 and/or may be able to perform some or all of the functions of television receiver 200. Accordingly, instances in this document referring to a STB and steps being performed by a STB may also be performed, more generally, by a television receiver.

FIG. 2 illustrates a block diagram of an embodiment of television receiver 200 that is configured to record omnibus channel files and extract a television program from a recorded omnibus channel file. Television receiver 200 may be television receiver of FIG. 1 and may be in the form of a STB that communicates with a display device such as a television. Television receiver 200 may be incorporated as part of a television, such as television 160 of FIG. 1. Television receiver 200 may include: processors 210 (which may include control processor 210-1 and tuning management processor 210-2), tuners 215, network interface 220, non-transitory computer-readable storage medium 225, electronic programming guide (EPG) database 230, television interface 235, networking information table (NIT) 240, digital video recorder (DVR) database 245, user interface 250, PID filters 255, smart card 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program map table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. In some embodiments timers are stored in some other database or storage arrangement. Control processor 210-1 may initiate recording of a television channel by sending a record command along with an indication of the television channel to be recorded to tuning management processor 210-2. Control processor 210-1 may not send a second record command (if additional recording is to begin at the same time) until an acknowledgement that recording of the first television channel has successfully been received and initiated by tuning management processor 210-2. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to audio/video decoder 233 for output to a presentation device, such as a television.

Control processor 210-1 may also communicate with network interface 220 and user interface 250. Control processor 210-1 may handle in-coming data from network interface 220 and user interface 250. Additionally, control processor 210-1 may be configured to output data via network interface 220.

Tuners 215 may include one or more tuners used to tune to television channels, such as television channels transmitted via satellite or cable. In the illustrated embodiment of television receiver 200, three tuners are present (tuner 215-1, tuner 215-2, and tuner 215-3). Each tuner contained in tuners 215 may be capable of receiving and processing a transport stream of data from a satellite transponder (or a cable RF channel) at a given time. This transport stream may contain audio and video data for multiple television channels in addition to other data. As such, a single tuner may tune to a single transponder (or, for a cable network, a single cable RF channel). If tuners 215 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be used for tuning.

Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent a non-transitory computer-readable storage medium. Storage medium 225 may include memory and/or a hard drive. Storage medium 225 may be used to store information received from one or more satellites and/or information received via network interface 220. Storage medium 225 may store information related to EPG database 230, and/or DVR database 245. In some embodiments, storage medium 225 may also be used to store various tables, such as NIT 240, PMT 257, and/or PAT. Recorded television programs may be stored using storage medium 225. Storage medium 225 may be partitioned or otherwise divided such that predefined amounts of storage medium 225 are devoted to storage of omnibus channel files and user-selected television programs. Storage medium 225 may be at least partially organized as a service descriptor table, which may be persistent or fetched as needed.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

In addition to being used to provide users with information about scheduled programming, information from EPG database 230 may be used to determine when television programs begin and end for the purposes of recording. For instance, if a channel-specific file is recorded that contains multiple television programs, the start and end of time of specific television programs within the channel-specific file may be based on the start and end times indicated in the EPG. Other data may be stored for the EPG that may be useful in managing channel-specific files, such as series identifiers and episode identifiers (which may be used by a television service provider to identify particular television programs).

Audio/video decoder 233 may serve to convert encoded video and audio into a format suitable for output to a display device. For instance, audio/video decoder 233 may receive MPEG video and audio from storage medium 225 or descrambling engine 265 to be output to a television. MPEG video and audio from storage medium 224 may have been recorded to DVR database 245 as part of a previously-recorded television program. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245 and/or information from EPG database 230) to a television for presentation.

The Network Information Table (NIT) 240 may store information used by television receiver 200 to access various television channels. NIT 240 may be stored locally by a processor, such as by tuning management processor 210-2. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers, frequency identifiers and/or transponder identifiers for various television channels. In some embodiments, NIT 240 may contain additional data or additional tables may be stored by the television receiver. For example, specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, video PIDs, and/or ECM (entitlement control message) PIDs for television channels that are transmitted on a transponder frequency.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and television receiver 200 may be able to handle this reassignment as long as NIT 240 is updated.

TABLE 1

| Channel | Satellite | Transponder |
|---------|-----------|-------------|
| 4 | 1 | 2 |
| 5 | 2 | 11 |
| 7 | 2 | 3 |
| 13 | 2 | 4 |

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, a known PMT PID may be used to retrieve a program map table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 240. Additional information on how NIT 240, as indicated in Table 1, may be used is provided in reference to FIG. 3.

A Digital Video Recorder (DVR) may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television stations. DVR database 245 may store timers that are used by control processor 210-1 to determine when a television channel should be tuned to and its programs recorded to DVR database 245 of storage medium 225. In some embodiments, timers are stored in another storage arrangement. For example, one or more timer files may be stored using the storage medium that indicate a television channel and a date/time period during which recording should be performed. In some embodiments, a limited amount of storage medium 225 may be devoted to DVR database 245. Timers may be set by the television service provider and/or one or more users of television receiver 200.

The DVR functionality of control processor 210-1 may have multiple modes. First, the DVR functionality of control processor 210-1 may be configured to record individual television programs selected by a user to DVR database 245. Using EPG database 230, a user may select a particular television program. Based on the date, time period, and television channel indicated by EPG database 230, Control processor 210-1 may record the associated television program to DVR database 245. Second, DVR database 245 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by the television service provider.

As an example of this second mode of DVR functionality, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight. If a television program is selected for recording by a user and is also specified for recording by the television service provider, the user selection may serve as an indication to save the television program for an extended time (beyond the time which the predefined recording would otherwise be saved).

User interface 250 may include a remote control (physically separate from television receiver 200) and/or one or more buttons on television receiver 200 that allows a user to interact with television receiver 200. User interface 250 may be used to select a television channel for viewing, view information from EPG database 230, and/or program a timer stored to DVR database 245, wherein the timer is used to control the DVR functionality of control processor 210-1.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with particular television channel. Particular data packets, referred to as entitlement control messages (ECMs) may be periodically transmitted. ECMs may be associated with another PID and may be encrypted; television receiver 200 may use smart card 260 to decrypt ECMs. Decryption of an ECM may only be possible if the user has authorization to access the particular television channel associated with the ECM. When an ECM is determined to correspond to a television channel being stored and/or displayed, the ECM may be provided to smart card 260 for decryption.

When smart card 260 receives an encrypted ECM, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260. Smart card 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite) a PID filter may be created based on a PID of PMT data. The PID of PMT data packets may be known because it is stored as part of NIT 240 or another table, such as a PAT. From the PMT data packets, PMT may be constructed by tuning management processor 210-2. Table 2 provides an exemplary extract of a PMT. PMT 257 may be specific to a particular transponder. As such, if tuning to a different transponder occurs, a new PMT may be created for the different transponder.

TABLE 2

| Channel | Video PID | 1$^{st}$ Audio PID | 2$^{nd}$ Audio PID |
|---|---|---|---|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in PMT 257, the audio and video PIDs for specific television channels may be identified. A television channel may have multiple audio PIDs due to a second audio program (SAP), which may be in a different language.

It should be understood that the values provided in Table 2 are for example purposes only. Actual values may vary. Additional information or less information may also be stored in PMT 257.

PID filters 255 may be configured to filter data packets based on PIDs. In some embodiments, PID filters 255 are created and executed by tuning management processor 210-2. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user, may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by smart card 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to audio/video decoder 233 for output to a television or other presentation equipment via television interface 235.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Also, while television receiver 200 may be used to receive, store, and present television channels received via a satellite, it should be understood that similar components may be used to receive, store, and present television channels via a cable network.

Figure 3:
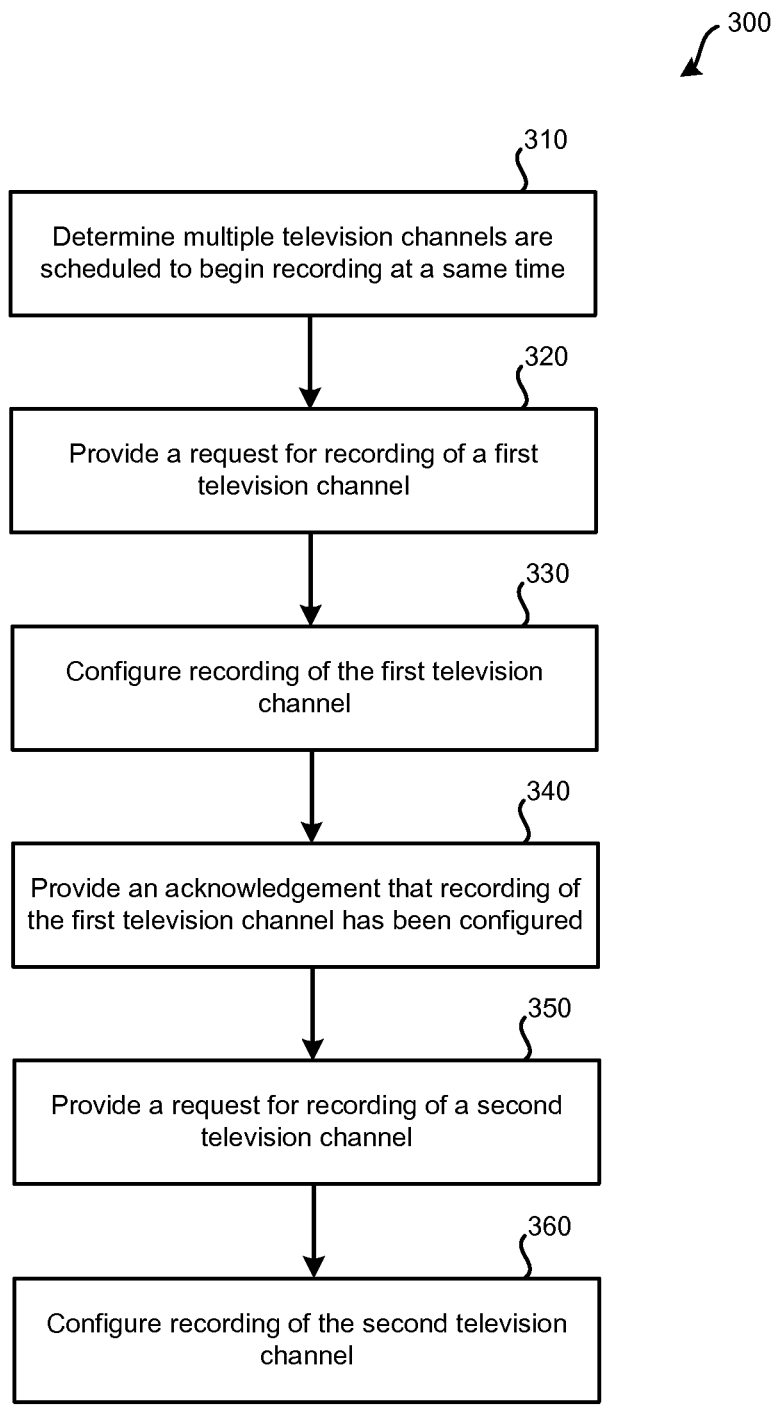
FIG. 3 illustrates an embodiment of a method for successive initiation of the recording of multiple television channels.

Various methods may be performed in conjunction with a television distribution system (e.g., satellite-based, cable-based, IP-based) and a television receiver. FIG. 3 illustrates an embodiment of a method 300 for successive initiation of the recording of multiple television channels. Method 300 may be performed using a television receiver, such as television receiver 200 of FIG. 2. The television receiver used to perform method 300 may be integrated into another device, such as a television, or may be in a standalone form, such as a set-top box. Means for performing the steps of method 300 include television receivers, which may include computerized components such multiple processors (which may include a control processor and/or a tuning management processor). More specifically, multiple processors present within a television receiver may be used to perform method 300. For example, a control processor that is in communication with a tuning management processor may be used to perform steps of method 300. The television receiver used to perform method 300 may receive data from a television service provider network, such as satellite television distribution system 100 of FIG. 1.

Method 300 may be useful to successively initiate recording of multiple television channels which are configured to begin recording at the same time. For example, a television service provider may configure a television receiver to record multiple television channels over the same period of time each weekday night. As a more specific example, each major television network, such as ABC, CBS, NBC, and FOX, may be recorded Monday through Friday from 7 PM until 10 PM each night. Accordingly, at 7 PM, each of these four television channels may be configured to begin being recorded. In some embodiments, each of these four television channels is received by a single tuner of the television receiver via a single transponder stream. As such, a single tuner may be used to receive multiple television channels on the single transponder stream.

At step 310, a determination may be made that the multiple television channels are scheduled to begin recording at a same time. This determination may be made by a control processor, such as control processor 210-1 of television receiver 200 of FIG. 2. The determination may be based on multiple timers being present within a DVR database, such as DVR database 245. For example, the control processor may access multiple timers that indicate a same start time for recording of different television channels. The multiple timers that indicate multiple television channels are to be recorded at the same time may have been created and provided to the television receiver by a television service provider. Each of these multiple television channels may be transmitted via a same transponder and satellite (e.g., on a same frequency and/or frequency band) of a satellite television distribution system. In some embodiments, rather than the multiple timers being created and provided to the television receiver by the television service provider, a user may have created the multiple timers (or at least one of the timers) scheduled to begin recording at the same time at the television receiver. While embodiments of method 300 can be applied to three or more television channels scheduled to be recorded at the same time, the following description of method 300 will be applied to a situation in which two television channels are scheduled to be recorded at the same time.

Following the multiple television channels that are scheduled to be recorded at the same time being determined at step 310, a request for recording/reception of the first television channel may be created and provided to another processor that is configured to handle the specifics of television channel recording at step 320. Such a request may indicate the television channel to be recorded. For example, a channel number may be provided as the indication of the first television channel to be recorded. In some embodiments, a television channel name or some other form of identifier may be used to indicate the television channel to be recorded. Such a request may be provided by control processor 210-1 to another processor, such as tuning management processor 210-2 of television receiver 200. Tuning management processor 210-2 may handle the specifics of tuning to the first television channel and filtering audio, video, and encryption packets associated with the first television channel. Once the request of step 320 is sent by the control processor to the tuning management processor, despite an additional television channel being scheduled to begin recording at the same time, a request for the second television channel to be recorded may not be sent until an acknowledgement is received by the control processor from the tuning management processor that indicates recording of the first television channel has been configured.

At step 330, recording of the first television channel may be configured. Configuring of recording of the first television channel may be performed by the tuning management processor in response to the request being received at step 320 from the control processor. Configuring recording of the first television channel may include tuning a tuner of the television receiver to an appropriate frequency to receive the television channel indicated in the request received at step 320. Referring to FIG. 2, tuning management processor 210-2 may provide an indication to a tuner of tuners 215 to tune to a particular frequency. The tuner selected for tuning to the particular frequency may be a tuner that was identified as being idle (i.e., not being used to receive another television channel for display or storage) by the tuning management processor. For example, if tuner 215-1 is idle, tuning management processor 210-2 may provide an indication to tuner 215-1 of the frequency to which tuner 215-1 is to tune and lock. Once the tuner has tuned and locked to the proper frequency, data transmitted on the transponder stream transmitted by the television service provider at that frequency (which may include each television channel of the multiple television channels to be recorded) may be output by tuner 215-1 to tuning management processor 210-2.

Configuration of the first television channel for recording may also include tuning management processor 210-2 creating and storing a program map table (PMT) that identifies the audio and video PIDs for some or all television channels transmitted as part of the transponder stream on the frequency to which tuner 215-1 is now tuned. The PMT may be constructed by creating a PID filter that filters packets having a PID associated with the PMT as indicated in an NIT or PAT stored locally by the television receiver. Configuration of recording of the first television channel may also include determining the audio and video PIDs associated with the first television channel using the PMT constructed for the transponder stream. A PID filter may be created for the audio and video PIDs associated with the first television channel. If multiple audio PIDs are available for the television channel, packets associated with one or both of the audio PIDs may be filtered by the PID filter. The filtered audio and video data packets may be stored to a file in a DVR database, such as DVR database 245 of television receiver 200.

Following configuration of the recording of the first television channel being completed, an acknowledgment may be created and transmitted to the control processor that indicates configuration of recording of the first television channel has occurred at step 340. The acknowledgement received by the control processor at step 340 may be received from the tuning management processor, such as tuning management processor 210-2 of television receiver 200. At this point in method 300, recording of the first television channel to a file may have commenced.

In response to receiving the acknowledgment at step 340, the control processor may provide a request for recording/ reception of a second television channel of the multiple television channels determined at step 310. The request provided at step 350 may be created by the control processor and sent to the tuning management processor. The request sent at step 350 may be in the same format as the request sent at step 320, but may instead indicate recording of the second television channel is to commence. This second television channel of the multiple television channels may be transmitted as part of the same transponder stream as the first television channel.

At step 360, recording of the second television channel may be configured. Configuring of recording of the second television channel may be performed by the tuning management processor in response to the second request being received at step 350 from the control processor. If the second television channel is transmitted as part of the same transponder stream by the television service provider, there may be no need to tune an additional tuner and/or create a PMT based on the request to record the second television channel. Configuration to record the second television channel may include creating an additional PID filter that filters the audio and video packets associated with the second television channel and causes audio and video data for the second television channel to be stored to a second file. As such, a first file may be created and stored for the first television channel while a second file is created and stored for the second television channel. Recording to both of these files may happen during a time period.

It should be understood that, similar to step 340, an acknowledgement may be provided by the tuning management processor to the control processor following successful configuration of recording of the second television channel. If additional television channels are to be recorded, method 300 may repeat a number of times as necessary.

Figure 4:
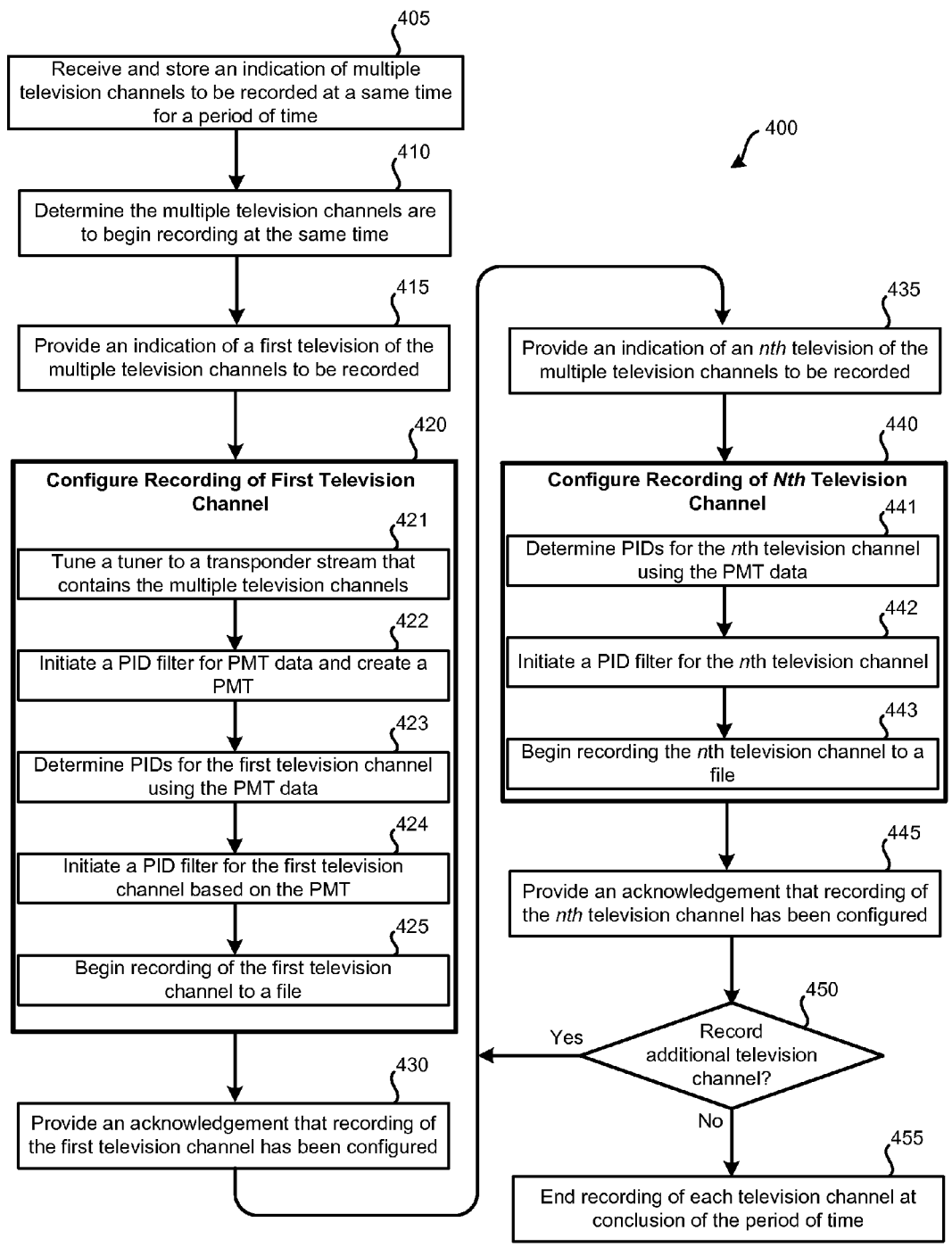
FIG. 4 illustrates another embodiment of a method for successive initiation of the recording of multiple television channels.

FIG. 4 illustrates another embodiment of a method for successive initiation of the recording of multiple television channels. Method 400 may be performed using a television receiver, such as television receiver 200 of FIG. 2. The television receiver used to perform method 400 may be integrated into another device, such as a television, or may be in a standalone form, such as a set-top box. Means for performing the steps of method 400 include television receivers, which may include computerized components such as multiple processors (which may include a control processor and/or a tuning management processor). More specifically, multiple processors present within a television receiver may be used to perform method 400. For example, a control processor that is in communication with a tuning management processor may be used to perform steps of method 400. The television receiver used to perform method 400 may receive data from a television service provider network, such as satellite television distribution system 100 of FIG. 1. Method 400 may represent a more detailed embodiment of method 300 of FIG. 3.

At step 405, indications of multiple television channels to be recorded at the same time for a period of time may be received. These indications may be received from a user and/or from a television service provider. The multiple television channels to be recorded may each be transmitted using a same transponder stream. As such, each of the television channels may be transmitted to the television receiver performing method 400 via a particular transponder of a satellite. Accordingly, following step 405, the television receiver may store indications for multiple television channels that indicate timers that indicate multiple television channels are to be recorded starting at the same time. Such timers may be stored in a DVR database.

At step 410, at or near the start time indicated by the timers, a determination may be made that the multiple television channels are scheduled to begin recording at a same time. This determination may be made by a control processor, such as control processor 210-1 of television receiver 200 of FIG. 2. The determination may be based on the multiple timers being present within the DVR database. Each of these multiple television channels may be transmitted via a same transponder and satellite (e.g., on a same frequency and/or frequency band) of a satellite television distribution system.

Following the multiple television channels that are scheduled to be recorded at the same time being determined at step 410, a request for recording of the first television channel may be created and provided to another processor that is configured to handle the specifics of television channel recording at step 415. Such a request may indicate the first television channel of the multiple television channels to be recorded and/or received (e.g., tuned to). For example, a channel number may be provided as the indication of the first television channel to be recorded. In some embodiments, a television channel name or some other form of identifier may be used to indicate the television channel to be recorded. Such a request may be provided by control processor 210-1 to another processor, such as tuning management processor 210-2 of television receiver 200. Tuning management processor 210-2 may handle the specifics of tuning to the first television channel and filtering audio, video, and encryption packets associated with the first television channel. Once the request of step 320 is sent by the control processor to the tuning management processor, despite one or more additional television channels being scheduled to begin recording at the same time, a request for the second television channel to be recorded may not be sent until an acknowledgement is received by the control processor from the tuning management processor that indicates recording of the first television channel has been configured.

At step 420, recording of the first television channel may be configured. Configuring of recording of the first television channel may be performed by the tuning management processor in response to the request being received at step 415 from the control processor. Configuring recording of the first television channel by the tuning management processor may involve multiple steps. Such multiple steps are shown in FIG. 4 as substeps of step 420. It should be understood that, for the first television channel to begin being recorded of the multiple television channels indicated in the indications of step 405, additional steps may be necessary as compared with the configuration of the recording of successive television channels that are transmitted in the same transponder stream as the first television channel.

At step 421, configuring recording of the first television channel may include tuning a tuner of the television receiver to an appropriate frequency to receive the television channel indicated in the request received at step 415. Referring to FIG. 2, tuning management processor 210-2 may provide an indication to a tuner of tuners 215 to tune to a particular frequency. The tuner selected for tuning to the particular frequency may be a tuner that was identified as being idle (i.e., not being used to receive another television channel for display or storage) by the tuning management processor. For example, if tuner 215-1 is idle, tuning management processor 210-2 may provide an indication to tuner 215-1 of the frequency to which tuner 215-1 is to tune and lock. Once the tuner has tuned and locked to the proper frequency, data transmitted on the transponder stream transmitted by the television service provider at that frequency (which may include each television channel of the multiple television channels to be recorded) may be output by tuner 215-1 to tuning management processor 210-2.

At step 422, configuration of the first television channel for recording may include tuning management processor 210-2 creating and executing a PID filter for PMT data transmitted as part of the transponder stream to which the tuner tuned at step 421. The tuning management processor may create a PID filter based on a PID indicated in an NIT or PAT stored by the television receiver. Data packets having this PID may be filtered from the transponder stream and used to create a PMT. The PMT may identify the audio and video PIDs for some or all of the television channels transmitted as part of the transponder stream on the frequency to which tuner 215-1 is now tuned. Accordingly, if each of the multiple television channels is transmitted as part of the transponder stream, the audio and video PID information for each of these television channels may be indicated in the PMT created at step 422. Following step 422, the PMT for the transponder stream to which a tuner is tuned at step 421 may be constructed.

At step 423, the PIDs for the audio and video of the first television channel may be determined using the PMT constructed at step 422. By using the PMT, the PIDs associated with the first television channel to be recorded can be determined. In addition to PIDs for the audio and video of the first television channel being identified using the PMT at step 423, PIDs for other data related to the first television channel, such as ECMs related to the first television channel, may be identified.

At step 424, a PID filter may be created and initialized for the audio and video packets associated with the first television channel. The PIDs used for the PID filter may be based on the PIDs identified at step 423. Therefore, the PID filter created at step 424 may filter audio, video, and/or other data (e.g., ECMs) related to the first television channel. The audio, video, and/or other data may begin being recorded for the first television channel to a file at step 425. Such recording may continue until the command is received by the tuning management processor that indicates recording of the television channel is to cease. Following step 425, configuration of recording the first television channel may be considered complete.

Following configuration of the recording of the first television channel being completed, an acknowledgment may be created and transmitted to the control processor that indicates configuration of recording of the first television channel has occurred at step 430. The acknowledgement received by the control processor at step 340 may be sent by the tuning management processor, such as tuning management processor 210-2 of television receiver 200 of FIG. 2.

In response to receiving the acknowledgment at step 430, the control processor may provide a request for recording/reception of an nth television channel of the multiple television channels determined at step 410. The request provided at step 435 may be created by the control processor and sent to the tuning management processor. The request sent at step 435 may be in the same format as the request sent at step 415, but may instead indicate recording of the nth television channel is to commence. This nth television channel of the multiple television channels may be transmitted as part of the same transponder stream as the first television channel. The first time step 435 of method 400 is performed, the nth television channel is the second television channel of the multiple television channels; the second time step 435 is performed, the nth television channel is the third television channel of the multiple television channels, etc.

At step 440, recording of the nth television channel may be configured. Configuring of recording of the nth television channel may be performed by the tuning management processor in response to the request being received at step 435 from the control processor. Configuring recording of the nth television channel by the tuning management processor may involve multiple steps. Such multiple steps are shown in FIG. 4 as substeps of step 440. It should be understood that fewer steps may be present from the nth television channel to be configured for recording than for the first television channel configured at step 420. Since the nth television channel may be transmitted as part of the same transponder stream as the first television channel, steps similar to steps 421 and 422 may not need to be performed as a subset to step 440. For configuring to record the nth television channel that is part of the transponder stream, a tuner may already be configured to receive the correct transponder stream and a PMT may have already been created for the transponder stream.

At step 441, the PIDs for the audio and video of the nth television channel may be determined using the PMT that was previously constructed at step 422. By using the PMT, the tuning management processor can determine the PIDs associated with the nth television channel of the multiple television channels to be recorded. In addition to PIDs for the audio and video of the nth television channel being identified using the PMT at step 441, PIDs for other data related to the nth television channel, such as ECMs related to the nth television channel, may be identified.

At step 442, a PID filter may be created and initialized for the audio and video packets associated with the nth television channel. The PIDs used for the PID filter may be based on the PIDs identified at step 441. Therefore, the PID filter created at step 442 may filter audio, video, and/or other data (e.g., ECMs) related to the nth television channel. The audio, video, and/or other data may begin being recorded for the nth television channel to a file at step 443. Such recording may continue until the command is received by the tuning management processor that indicates recording of the nth television channel is to cease. Following step 443, configuration of recording the first television channel may be considered complete.

Following configuration of the recording of the nth television channel being completed, an acknowledgment may be created and transmitted to the control processor that indicates configuration of recording of the nth television channel has occurred at step 445. The acknowledgement received by the control processor at step 445 may be sent by the tuning management processor, such as tuning management processor 210-2 of television receiver 200 of FIG. 2.

At step 450, it may be determined if one or more television channels of the multiple television channels determined at step 410 still need to have recording initialized. If yes, method 400 may return to step 435 and repeat for successive television stations of the plurality of television stations. In some embodiments, four television channels transmitted as part of the same transponder stream are scheduled to begin at the same time. If at step 450 no additional television channels are determined to need to be initialized. Method 400 may the wait until recording of one or more of the television programs is to cease.

At step 455, a command may be issued to the tuning management processor to cease recording one or more of the television channels. The control processor may issue an individual command for each television channel being recorded that indicates recording of the television program is to cease. Each command may indicate the television channel. The control processor may not wait for any acknowledgement when sending cease-recording commands. When the cease-recording commands are received by the tuning management processor, the tuning management processor may cease recording the television channels to their respective files. The cease-recording commands may be based on a time indicated by the timers stored at step 405. In some embodiments, a single command issued by the command processor may cease recording of each of the multiple television channels.

Figure 5:
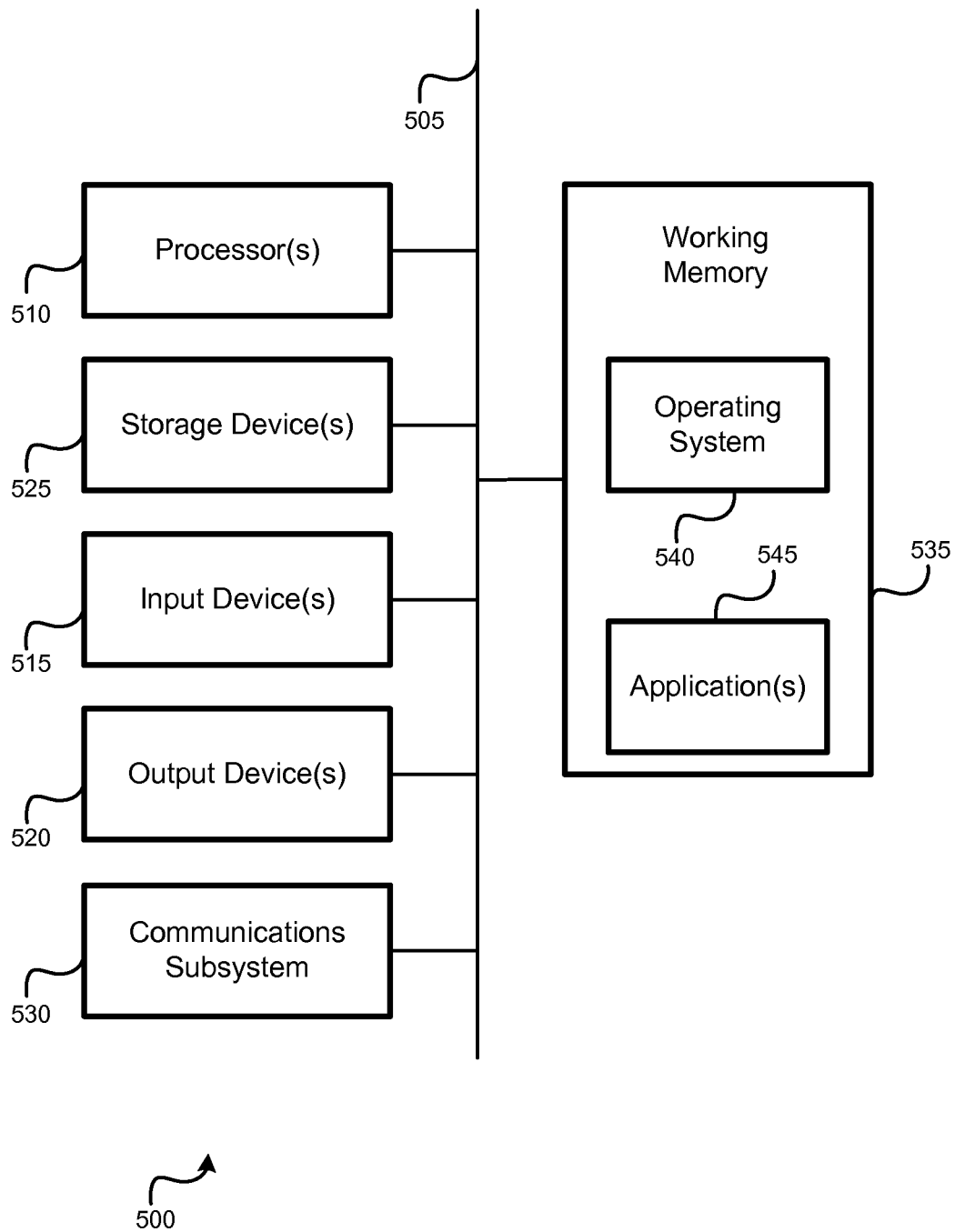
FIG. 5 illustrates an embodiment of a computer system.

A computer system as illustrated in FIG. 5 may be incorporated as part of the previously described computerized devices. For example, computer system 500 can represent some of the components of the television receivers and/or satellite television distribution system. FIG. 5 provides a schematic illustration of one embodiment of a computer system 500 that can perform steps of the methods. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard, and/or the like; and one or more output devices 520, which can include without limitation a display device, a printer, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the non-transitory storage device(s) 525. Merely by way of example, execution of the sequences of instructions contained in the working memory 535 might cause the processor(s) 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 (and/or components thereof) generally will receive signals, and the bus 505 then might carry the signals (and/or the data, instructions, etc. carried by the signals) to the working memory 535, from which the processor(s) 510 retrieves and executes the instructions. The instructions received by the working memory 535 may optionally be stored on a non-transitory storage device 525 either before or after execution by the processor(s) 510.

It should further be understood that the components of computer system 500 can be distributed across a network. For example, some processing may be performed in one location using a first processor while other processing may be performed by another processor remote from the first processor. Other components of computer system 500 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A television receiver system for successive initialization of television channel recording, the television receiver system comprising:
   a control processor, configured to:
      determine a plurality of television channels are configured to begin recording at a same time based on a first stored timer and a second stored timer stored by the television receiver system;
      transmit, to a tuning management processor, a first request for recording of a first television channel of the plurality of television channels based on the first stored timer; and
      in response to the control processor receiving an acknowledgement that was transmitted by the tuning management processor in response to the first recording of the first television channel being configured, transmit, to the tuning management processor, a second request for recording of a second television channel of the plurality of television channels based on the second stored timer;
   the tuning management processor, configured to:
      configure a first recording of the first television channel in response to the first request;
      transmit the acknowledgement to the control processor in response to the first recording of the first television channel being configured; and
      cause the first television channel to be recorded to a file.

2. The television receiver system for successive initialization of television channel recording of claim 1, the television receiver system further comprising:
   a tuner, wherein each television channel of the plurality of television channels is tuned to using the tuner.

3. The television receiver system for successive initialization of television channel recording of claim 2, wherein the tuning management processor being configured to configure the first recording of the first television channel in response to the first request comprises the tuning management processor being configured to:
   tune the tuner to a frequency of a transponder stream, wherein the plurality of television channels are transmitted as part of the transponder stream; and initiate a first packet identifier filter for a first packet identifier to capture program data from the transponder stream, wherein the program data indicates packet identifiers of video streams and audio streams of the plurality of television channels.

4. The television receiver system for successive initialization of television channel recording of claim 3, wherein the tuning management processor being configured to configure the first recording of the first television channel in response to the first request comprises the tuning management processor being configured to:
use the program data captured using the first packet identifier filter to determine a second packet identifier and a third packet identifier associated with the first television channel; and
initiate a second packet identifier filter to capture audio data and video data from the transponder stream for the first television channel, wherein
the second packet identifier filter filters based on the second packet identifier and the third packet identifier.

5. The television receiver system for successive initialization of television channel recording of claim 4, wherein the tuning management processor is further configured to:
configure a second recording of the second television channel in response to the second request, wherein configuring the second recording of the second television channel comprises the tuning management processor being configured to:
use the program data captured using the first packet identifier filter to determine a fourth packet identifier and a fifth packet identifier associated with the second television channel; and
initiate a third packet identifier filter to capture audio data and video data from the transponder stream for the second television channel, wherein the third packet identifier filter filters using the fourth packet identifier and the fifth packet identifier.

6. The television receiver system for successive initialization of television channel recording of claim 5, wherein the tuning management processor is further configured to:
transmit a second acknowledgement to the control processor following the second recording of the second television channel being configured.

7. The television receiver system for successive initialization of television channel recording of claim 1, wherein the television receiver system is configured to receive an indication of the plurality of television channels to be simultaneously recorded for a period of time from a television service provider via satellite.

8. A method for successive initialization of television channel recording, the method comprising:
determining, by a control processor of a television receiver, a plurality of television channels are configured to begin recording at a same time based on a first timer and a second timer stored by the television receiver;
transmitting, by the control processor to a tuning management processor of the television receiver, a first request for reception of a first television channel of the plurality of television channels based on the first timer; and
configuring, by the tuning management processor, a first recording of the first television channel in response to the first request;
causing, by the tuning management processor, the first television channel to be recorded to a file;

transmitting, by the tuning management processor to the control processor, an acknowledgement to the control processor in response to the first recording of the first television channel being configured; and
in response to the control processor receiving the acknowledgement that was transmitted by the tuning management processor to the control processor in response to the first recording of the first television channel being configured, transmitting, by the control processor to the tuning management processor, a second request for reception of a second television channel of the plurality of television channels based on the second timer.

9. The method for successive initialization of television channel recording of claim 8, the method further comprising:
tuning, using a tuner of the television receiver, to each television channel of the plurality of television channels.

10. The method for successive initialization of television channel recording of claim 9, wherein configuring the first recording of the first television channel in response to the first request comprises:
tuning the tuner to a frequency of a transponder stream, wherein
the plurality of television channels are transmitted as part of the transponder stream; and
initiating a first packet identifier filter for a first packet identifier to capture program data from the transponder stream, wherein
the program data indicates packet identifiers of video streams and audio streams of the plurality of television channels.

11. The method for successive initialization of television channel recording of claim 10, wherein configuring the first recording of the first television channel in response to the first request comprises:
using the program data captured using the first packet identifier filter to determine a second packet identifier and a third packet identifier associated with the first television channel; and
initiating a second packet identifier filter to capture audio data and video data from the transponder stream for the first television channel, wherein
the second packet identifier filter filters based on the second packet identifier and the third packet identifier.

12. The method for successive initialization of television channel recording of claim 11, further comprising:
configuring a second recording of the second television channel in response to the second request, wherein
configuring the second recording of the second television channel comprises:
using the program data captured using the first packet identifier filter to determine a fourth packet identifier and a fifth packet identifier associated with the second television channel; and
initiating a third packet identifier filter to capture audio data and video data from the transponder stream for the second television channel, wherein
the third packet identifier filter filters using the fourth packet identifier and the fifth packet identifier.

13. The method for successive initialization of television channel recording of claim 12, further comprising:
    transmitting, by the tuning management processor, a second acknowledgement to the control processor following the second recording of the second television channel being configured.

14. The method for successive initialization of television channel recording of claim 8, further comprising:
    receiving, by the television receiver, an indication of the plurality of television channels to be simultaneously recorded for a period of time from a television service provider via satellite.

15. An apparatus for successive initialization of television channel recording, the apparatus comprising:
    means for determining a plurality of television channels are configured to begin recording at a same time based on a first timer and a second timer stored by the apparatus;
    means for transmitting a first request for reception of a first television channel of the plurality of television channels based on the first timer; and
    means for configuring a first recording of the first television channel in response to the first request;
    means for causing the first television channel to be recorded to a file;
    means for transmitting an acknowledgement from a second processing means to a first processing means following the first recording of the first television channel being configured; and
    means for transmitting, by the first processing means, in response to receiving the acknowledgement from the second processing means that was transmitted in response to the first recording of the first television channel being configured, a second request for reception of a second television channel of the plurality of television channels based on the second tuner.

16. The apparatus for successive initialization of television channel recording of claim 15, the apparatus further comprising:
    means for tuning to each television channel of the plurality of television channels.

17. The apparatus for successive initialization of television channel recording of claim 16, wherein the means for configuring the first recording of the first television channel in response to the first request comprises:
    means for tuning to a frequency of a transponder stream, wherein
        the plurality of television channels are transmitted as part of the transponder stream; and
    means for initiating a first packet identifier filter for a first packet identifier to capture program data from the transponder stream, wherein
        the program data indicates packet identifiers of video streams and audio streams of the plurality of television channels.

18. The apparatus for successive initialization of television channel recording of claim 17, wherein the means for configuring the first recording of the first television channel in response to the first request comprises:
    means for using the program data captured using the first packet identifier filter to determine a second packet identifier and a third packet identifier associated with the first television channel; and
    means for initiating a second packet identifier filter to capture audio data and video data from the transponder stream for the first television channel, wherein
        the second packet identifier filter filters based on the second packet identifier and the third packet identifier.

19. The apparatus for successive initialization of television channel recording of claim 18, further comprising:
    means for configuring a second recording of the second television channel in response to the second request, wherein
        the means for configuring the second recording of the second television channel comprises:
            means for using the program data captured using the first packet identifier filter to determine a fourth packet identifier and a fifth packet identifier associated with the second television channel; and
            means for initiating a third packet identifier filter to capture audio data and video data from the transponder stream for the second television channel, wherein
                the third packet identifier filter filters using the fourth packet identifier and the fifth packet identifier.

20. The apparatus for successive initialization of television channel recording of claim 19, further comprising:
    means for transmitting a second acknowledgement following the second recording of the second television channel being configured.

* * * * *